(12) United States Patent
Novakovic et al.

(10) Patent No.: US 12,030,259 B2
(45) Date of Patent: Jul. 9, 2024

(54) MACHINE AND METHOD FOR WELDING PLASTIC PARTS TOGETHER

(71) Applicant: SPM AUTOMATION (CANADA) INC., Oldcastle (CA)

(72) Inventors: Boris Novakovic, Lakeshore (CA); Zachary Touesnard, Windsor (CA); Rade Pupovac, Tecumseh (CA); Christian Peter Holtkamp, Windsor (CA); Eiwan Benyamien, Windsor (CA)

( * ) Notice: Subject to any disclaimer, the term of this patent is extended or adjusted under 35 U.S.C. 154(b) by 80 days.

(21) Appl. No.: 17/680,539

(22) Filed: Feb. 25, 2022

(65) Prior Publication Data
US 2022/0274350 A1    Sep. 1, 2022

Related U.S. Application Data

(60) Provisional application No. 63/154,068, filed on Feb. 26, 2021.

(51) Int. Cl.
*B29C 65/78*    (2006.01)
*B29C 65/16*    (2006.01)

(52) U.S. Cl.
CPC ...... *B29C 65/7802* (2013.01); *B29C 65/1638* (2013.01)

(58) Field of Classification Search
CPC .................. B29C 65/7802; B29C 65/1638
See application file for complete search history.

(56) References Cited

U.S. PATENT DOCUMENTS

| 4,086,122 A * | 4/1978 | Bouyoucos ......... B29C 66/1312 228/2.1 |
| 6,074,504 A * | 6/2000 | Yu ....................... B29C 66/9161 156/304.6 |
| 2001/0032387 A1 * | 10/2001 | Nagasaki ................. H05K 3/14 29/840 |
| 2013/0068384 A1 * | 3/2013 | Liu ....................... C03B 23/203 219/121.61 |

FOREIGN PATENT DOCUMENTS

DE     202013007317 U1 * 12/2014    ............. B29C 65/06

OTHER PUBLICATIONS

Machine Translation of DE-202013007317-U1 (Year: 2006).*

* cited by examiner

*Primary Examiner* — Daniel McNally
(74) *Attorney, Agent, or Firm* — George L. Boller

(57) ABSTRACT

A first plastic part is fixtured in a first fixture, and a second plastic part is fixtured in a second fixture for welding to each other. The first plastic part can be independently moved relative to the second plastic part in each of three directions: 1) linearly in a direction parallel with a z-axis, 2) linearly in a direction parallel with an x-axis, and 3) circularly in a circular arc about an axis parallel with a y-axis.

9 Claims, 46 Drawing Sheets

MACHINE AND METHOD FOR WELDING PLASTIC PARTS TOGETHER

TECHNICAL FIELD

This disclosure relates to a machine, and a method, for welding plastic parts together.

BACKGROUND

Plastic parts are commonly manufactured by a molding process, such as blow molding or injection molding, and then further processed by one or more operations such as boring, drilling, and/or welding.

Welding is a process for joining plastic parts together by melting plastic at a location in each part where the parts are to be welded to each other to create a weld joint, then placing the parts together so that their melt pools merge together, and finally allowing the melt pools to solidify into the finished weld joint.

As explained in Applicant's prior patents, contact welding and non-contact welding are two types of plastic welding. Contact welding comprises placing parts which are to be joined together in direct contact with a heating element, such as a hot plate, at locations on the parts where a weld joint is to be created. Then after sufficient melting of plastic, the parts are placed together at their melt pools and the melt pools are allowed to solidify. Non-contact welding comprises placing a heating element a short distance from a part, and using radiated heat, instead of direct contact, to melt plastic. In both types of welding, an industrial robot is commonly used to position a heating element, or elements, to melt plastic at surfaces of the parts where the parts are to be joined.

Instead of using contact or non-contact heating elements to melt plastic, one or more industrial-type lasers may be used to perform what is referred to as a Direct Exposure Laser Welding (DELW) process.

In one example of DELW, the plastic parts which are to be welded together are fixtured in respective tooling fixtures mounted on respective platens of a welding machine. As in hot plate welding, at least one platen is movable toward and away from the other platen for creating an open space between the fixtured parts sufficient to allow one or more lasers to be moved into the open space and then operated to direct energy onto surfaces of the parts at locations where a weld joint for joining the parts together is to be created. The energy continues to be applied until the surfaces are sufficiently melted to create weld pools capable of merging with each other when placed in contact. The lasers are then moved out of the open space along a controlled path, or paths, for subsequently allowing the machine to move the fixtured parts in a controlled manner which brings their melt pools together and then holds the parts in place until the merged melt pools solidify to create a welded assembly of the parts. After that, the parts which have been joined are unfixtured from their respective fixtures, and the machine operates to move the fixtures away from each other and thereby allow an assembly of the welded parts to be removed from one of the fixtures which is holding the assembly.

A weld joint at which parts are to be joined has a shape which is a function of the geometries of the parts. Some parts may have shapes which allow the weld joint to lie in a two-dimensional flat plane. After melting of plastic at locations on the parts where a weld joint is to be created, the parts can be joined together by moving them together in a direction perpendicular to the two-dimensional flat plane and applying a controlled force in that same direction until the melts solidify. The direction in which the holding force is applied is called the weld force vector and the two-dimensional plane of the weld joint is called the weld plane.

Other plastic parts may have shapes which require the weld joint to be three-dimensional rather than two-dimensional. A three-dimensional weld joint can range from being relatively simple to relatively complex. An example of a relatively simple three-dimensional weld joint is one which has slight three-dimensional curvature. A relatively complex three-dimensional weld joint is one which is more extremely curved and/or irregular.

Applicant's U.S. Pat. No. 10,562,232 describes an example of a complex weld joint in an exterior lamp assembly, such as a tail lamp assembly for certain automotive vehicles. The weld joint joins a first part, a lens, to a second part, a lamp housing. Such a housing is styled by automotive designers to wrap around a rear corner of a vehicle body. While such a tail lamp assembly faces primarily rearwardly away from the vehicle body, it also wraps around an adjacent side of the vehicle to provide a side marker lamp function. The weld joint of such an assembly must be leak-proof, and if it is not, the assembly is scrapped.

The solution disclosed in Applicant's above-mentioned Patent utilizes coordinated control of relative x-axis, y-axis, and z-axis linear motions between a housing which is fixtured on a first tooling plate and a lens which is fixtured on a second tooling plate. After the surface areas of the housing and the lens which are to be welded together have been properly melted and a heating tool (or tools) has (or have) been moved out of the space between the housing and the lens, control of relative x-axis, y-axis, and z-axis motions enables potential interferences between the housing and the lens to be avoided as they approach each other so that the melt pools of the surfaces can finally come into proper contact with each other and merge. The magnitude of the weld force vector along each of the three axes can then be independently controlled to provide suitable weld forces long the weld joint for sufficiently merging the melt pools throughout the weld joint to impart integrity to the joint as the merged melt pools cool and solidify.

When plastic welding is being considered for joining the lens and the housing of a proposed design for a tail lamp assembly, analysis of the design by plastic welding engineers and technicians may conclude that no weld joint geometries that would provide acceptable mass-production manufacture of leak-proof lamp assemblies are possible.

While Applicant's above-mentioned Patent provides a solution for certain complex weld joint geometries, that solution may not available for even more complex lamp assembly designs.

SUMMARY OF THE DISCLOSURE

Briefly, this disclosure introduces a plastic welding machine which can reliably weld more complex weld geometries for plastic parts which previously could not be consistently reliably welded on a mass-production basis.

The disclosed machine to be introduced here operates to weld a first plastic part and a second plastic part together at respective surfaces after those surfaces have been melted to create respective melt pools, the parts have been placed together to merge their melt pools, and the melt pools have been allowed to cool to solidification.

The machine has a structural framework for supporting various assemblies and components of the machine.

The machine comprises a first platen and a second platen which are relatively movable linearly toward and away from each other on the framework along with an imaginary z-axis of a three-dimensional orthogonal system (Cartesian coordinate system).

A slide assembly is mounted on the first platen. The slide assembly comprises a base plate which is fastened to the first platen and a slide plate which can translate linearly on the base plate relative to both platens in a direction parallel with an imaginary x-axis of the three-dimensional orthogonal system.

A tilt plate is mounted on the slide plate for tilting about a tilt axis about an axis parallel with an imaginary y-axis of the three-dimensional orthogonal system.

A first tooling plate is fastened to the tilt plate. A first fixture for fixturing a first plastic part is fastened to the first tooling plate. A second tooling plate is fastened to the other platen, and a second fixture for fixturing a second plastic part is fastened to the second tooling plate. With the first plastic part fixtured in the first fixture, and the second plastic part fixtured in the second fixture, the first plastic part can be independently moved relative to the second plastic part in each of three directions: 1) linearly in a direction parallel with the z-axis, 2) linearly in a direction parallel with the x-axis, and 3) circularly in a circular arc about an axis parallel with the y-axis.

In one embodiment of the machine, the second platen is immovably fastened to the machine framework. That embodiment is used to perform a DELW process.

In another embodiment of the machine, the second platen is capable of linear motion along the z-axis toward and away from the first platen. That embodiment is used to perform a Through Transmission Laser welding (TTL) welding process.

This disclosure also relates to methods performed by the disclosed plastic welding machines.

DETAILED DESCRIPTION

Figure 1:
FIG. 1 is a perspective view of a first plastic part and a second plastic part which are to be welded together.
Figure 2:
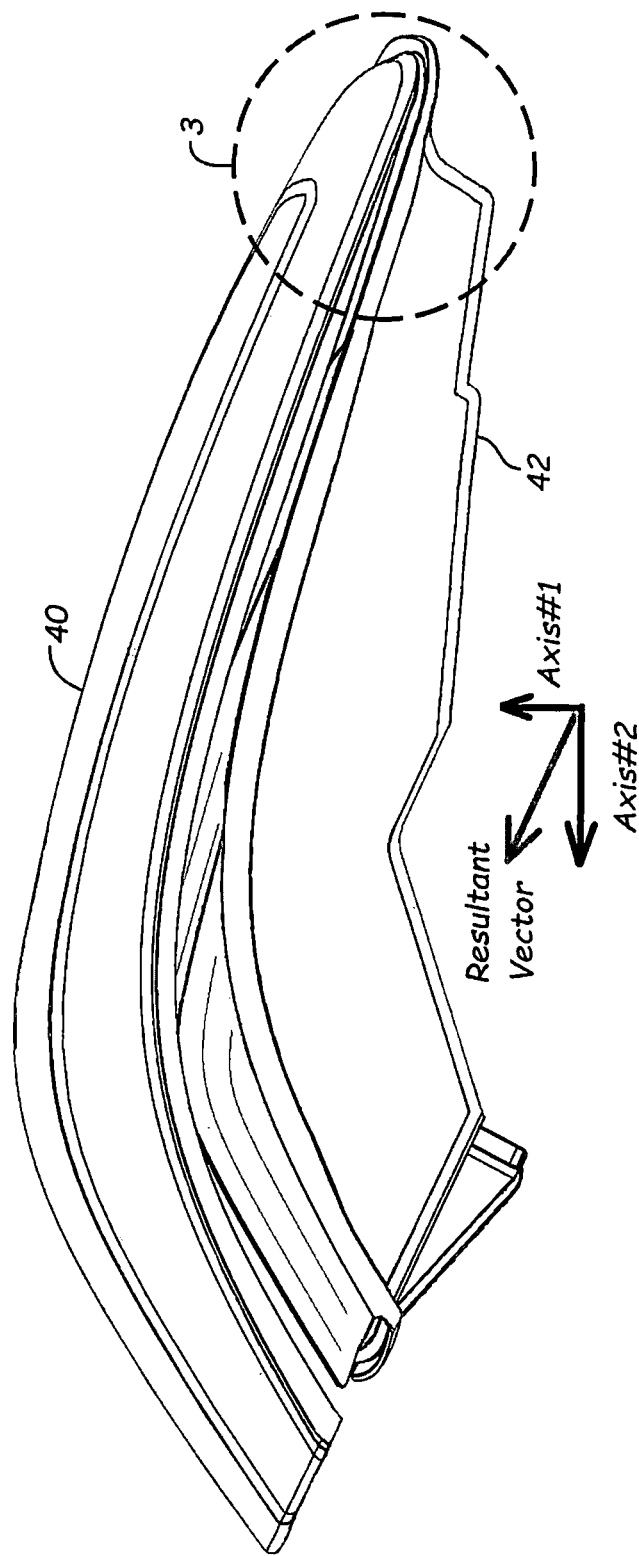
FIG. 2 is a perspective view which will be used to explain why the parts of FIG. 1 cannot be welded together using the machine and method as described in Applicant's patent mentioned above.
Figure 3:
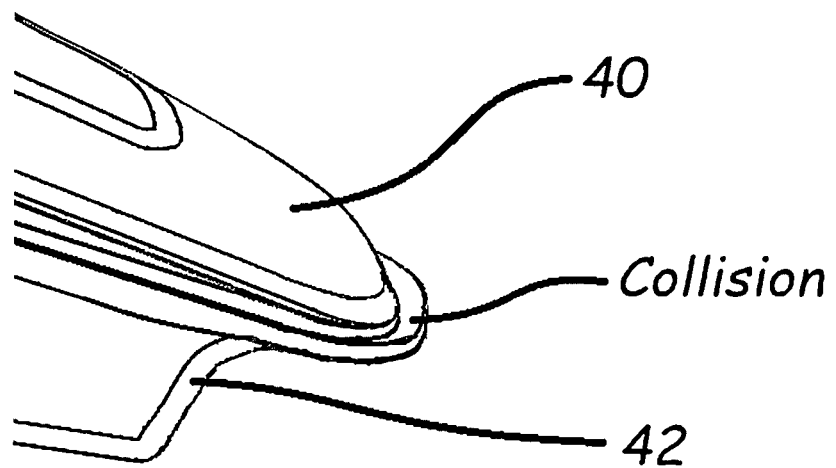
FIG. 3 is an enlarged view within circle 3 in FIG. 2.

FIG. 1-3 illustrate an example of why certain plastic parts are incapable of being properly welded together using the machine and method of Applicant's above-mentioned patent. Part 40 is a plastic taillight lens and part 42 is a plastic taillight housing. The shapes of the parts allow them to fit together at mating surfaces where a weld joint is to be created, but when fixtured in fixtures of respective tooling plates mounted on respective platens of a welding machine which provide only linear motions, such as z-axis motion, of one fixtured part relative to the other, the mating surfaces cannot be mated together because of the shapes of the parts.

FIG. 3 shows the location where the parts will collide and prevent them from being properly mated. Internal components of a part surrounded by a surface where a weld joint is to be created may also prevent proper mating of the parts. Reorienting the parts is of no avail. When the parts are not in the machine, they can be properly mated by hand, but when mounted in respective fixtures on the machine platens, the z-axis motion of the machine platens relative to one another is simply incapable of properly mating them for welding.

If the melt pools of the parts being joined do not uniformly come together as they begin to merge, melt may smear before the parts fully come together, and that can result in a weak, or leaky, joint when the melts cool and solidify.

Figure 4:
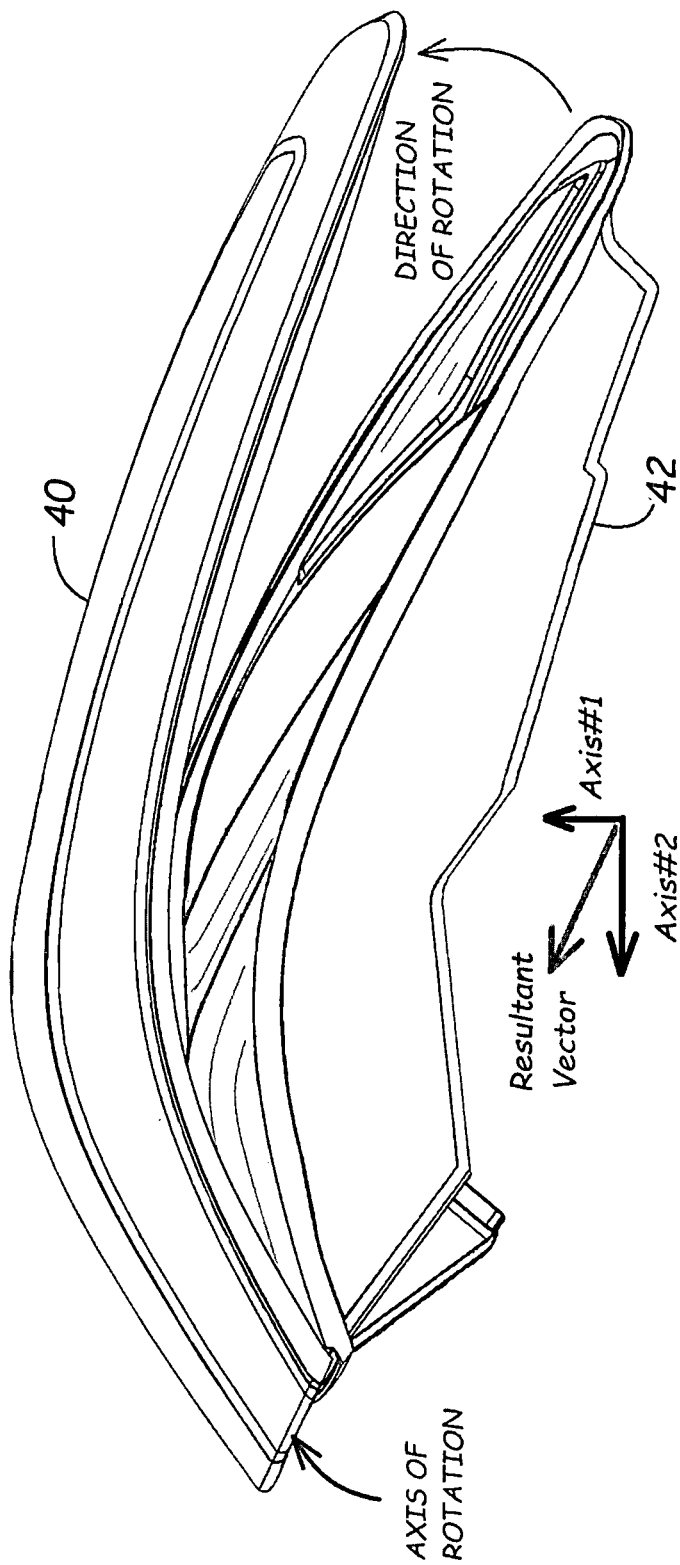
FIG. 4 is a perspective view useful in explaining the solution disclosed herein for enabling the parts of FIG. 1 to be welded together.

FIG. 4 shows how control of relative rotation between the parts, in coordination with control of linear motions, such as along an x-axis and a z-axis, in the orthogonal coordinate system, can orient the parts being joined as they are moving toward each other so that collisions not only with each other but also with parts of the machine are avoided, and the parts being joined can ultimately be positioned to place their melt pools in full contact with each other for merging and subsequent cooling to solidification. The direction and magnitude of the weld force vector are controlled as the weld pools merge and cool.

Figure 5:
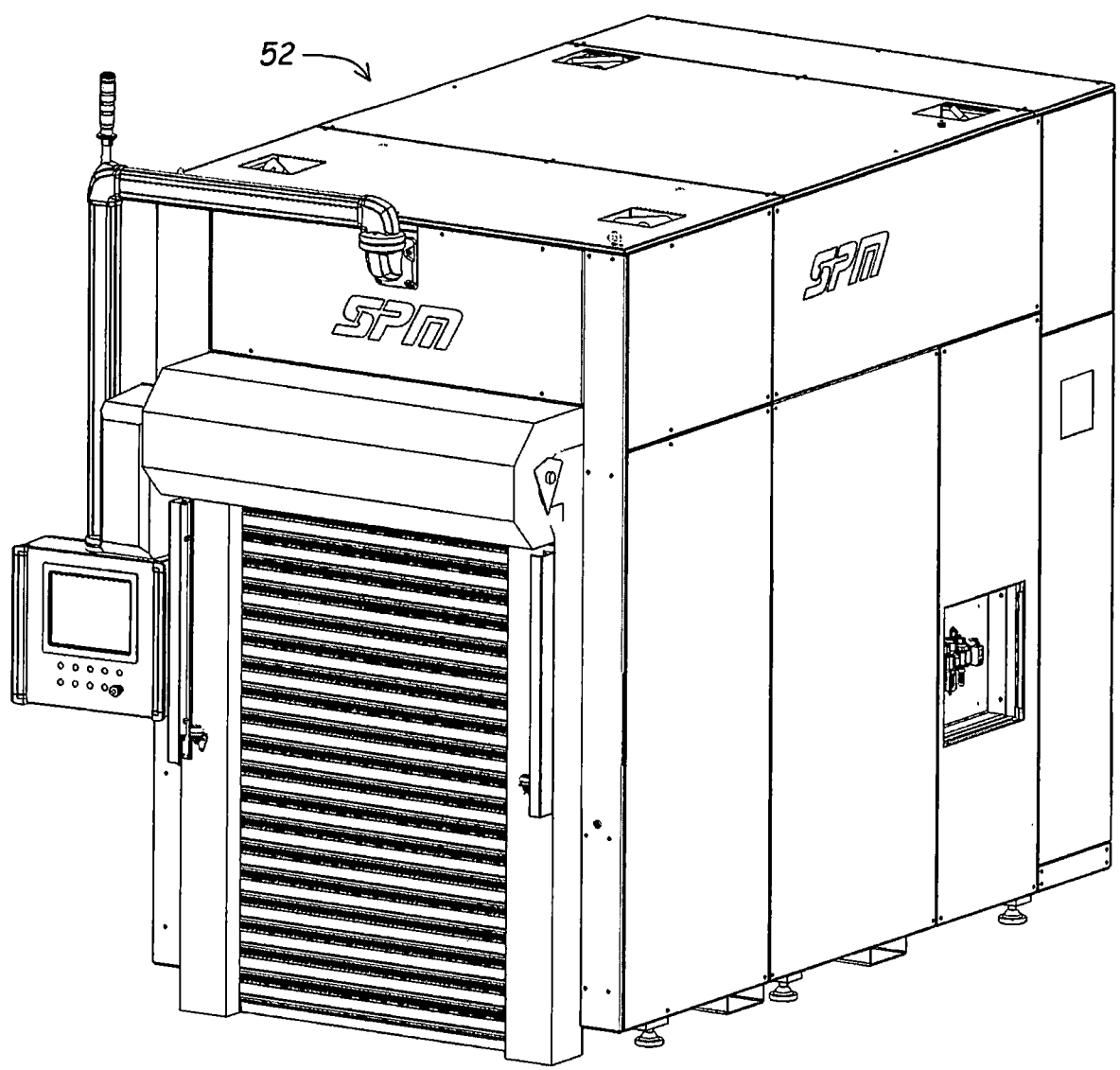
FIG. 5 is a perspective view of the exterior of an enclosure for the welding machine embodiments disclosed herein.
Figure 7:
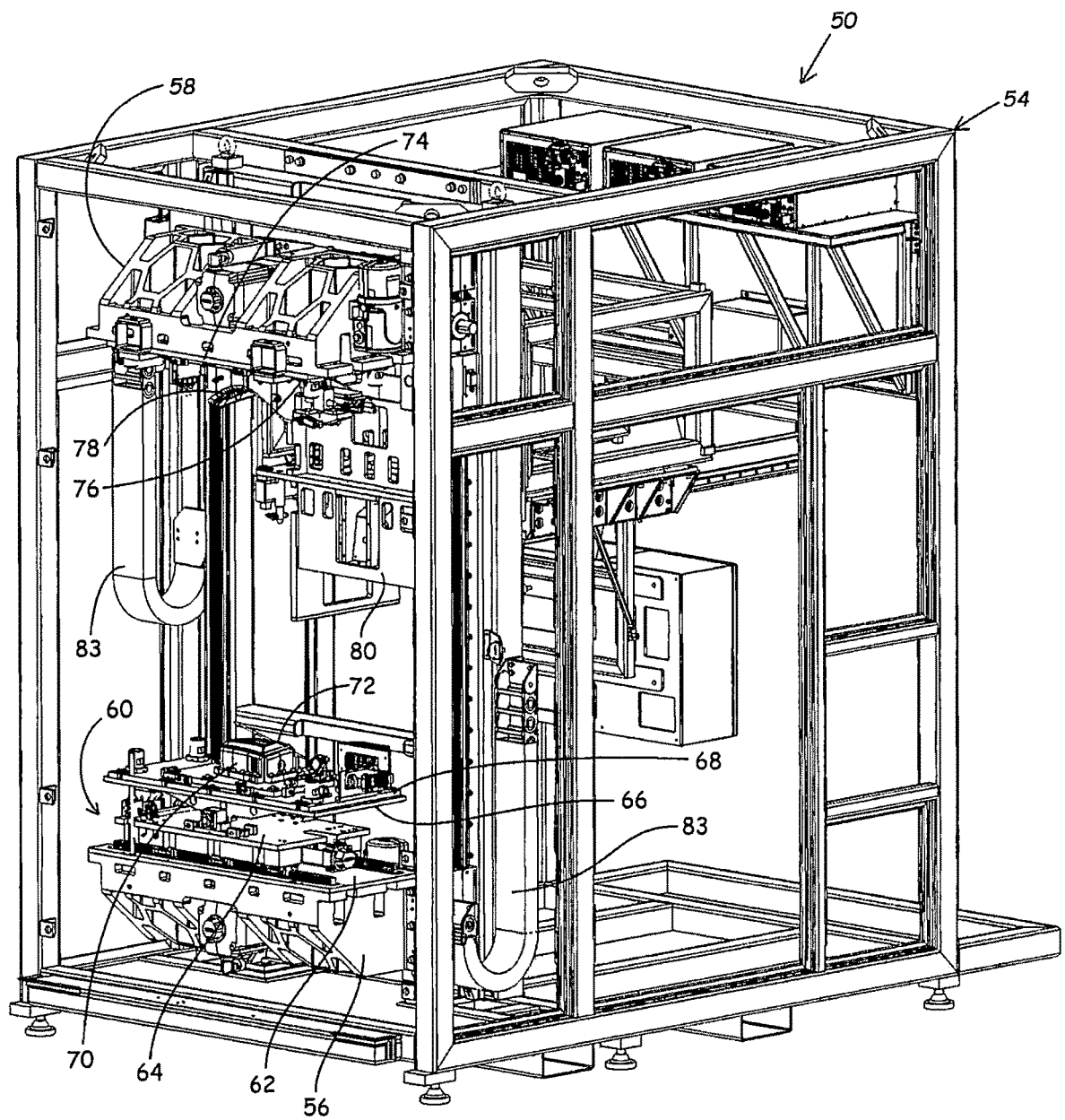
FIG. 7 is a perspective view in substantially the same direction as that of FIG. 5 showing a welding machine for performing a DELW process housed within the enclosure.
Figure 8:
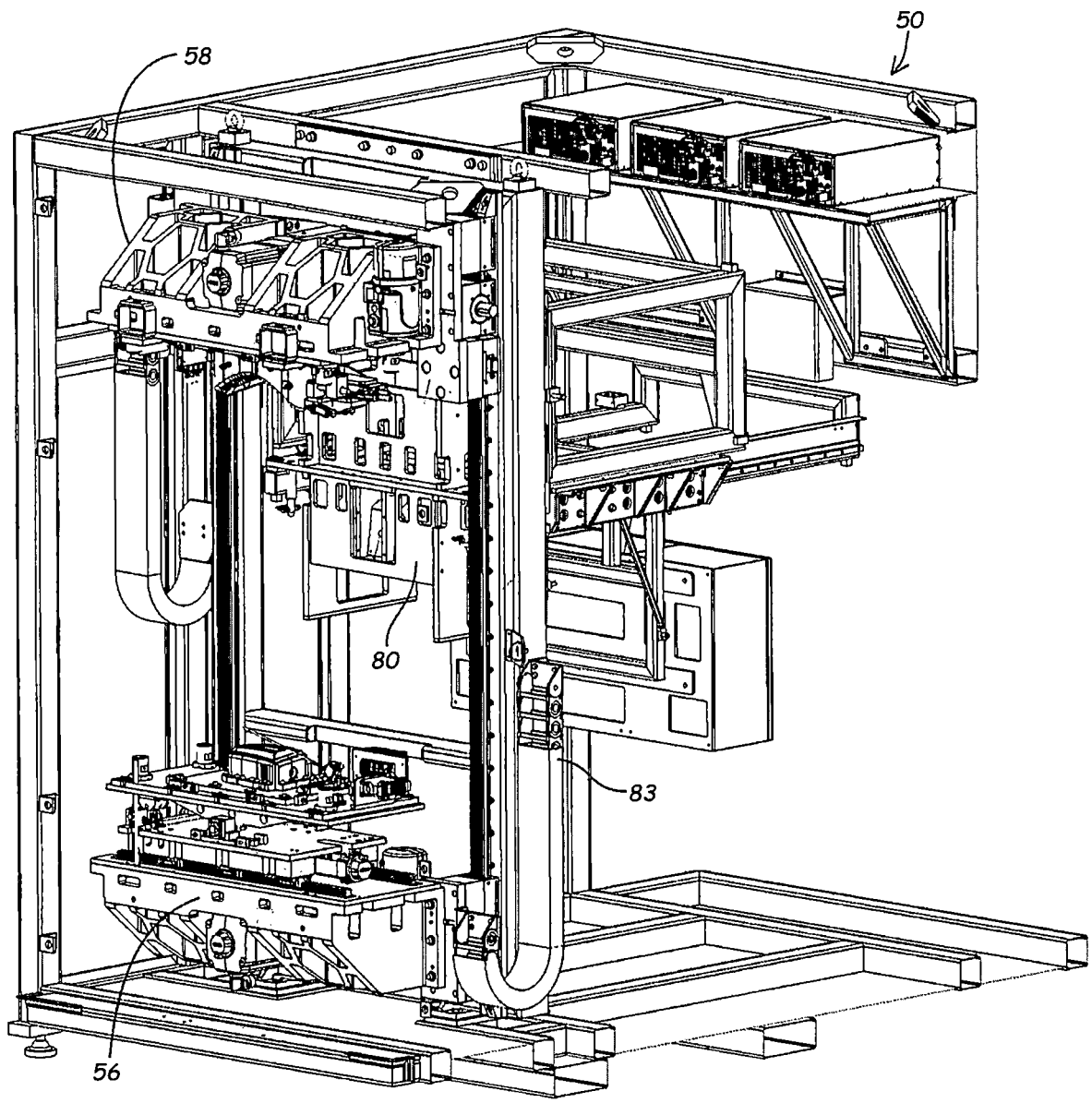
FIG. 8 is a perspective view of FIG. 7 with some parts of the machine having been removed for more completely illustrating certain parts which are not fully seen in FIG. 7.
Figure 9:
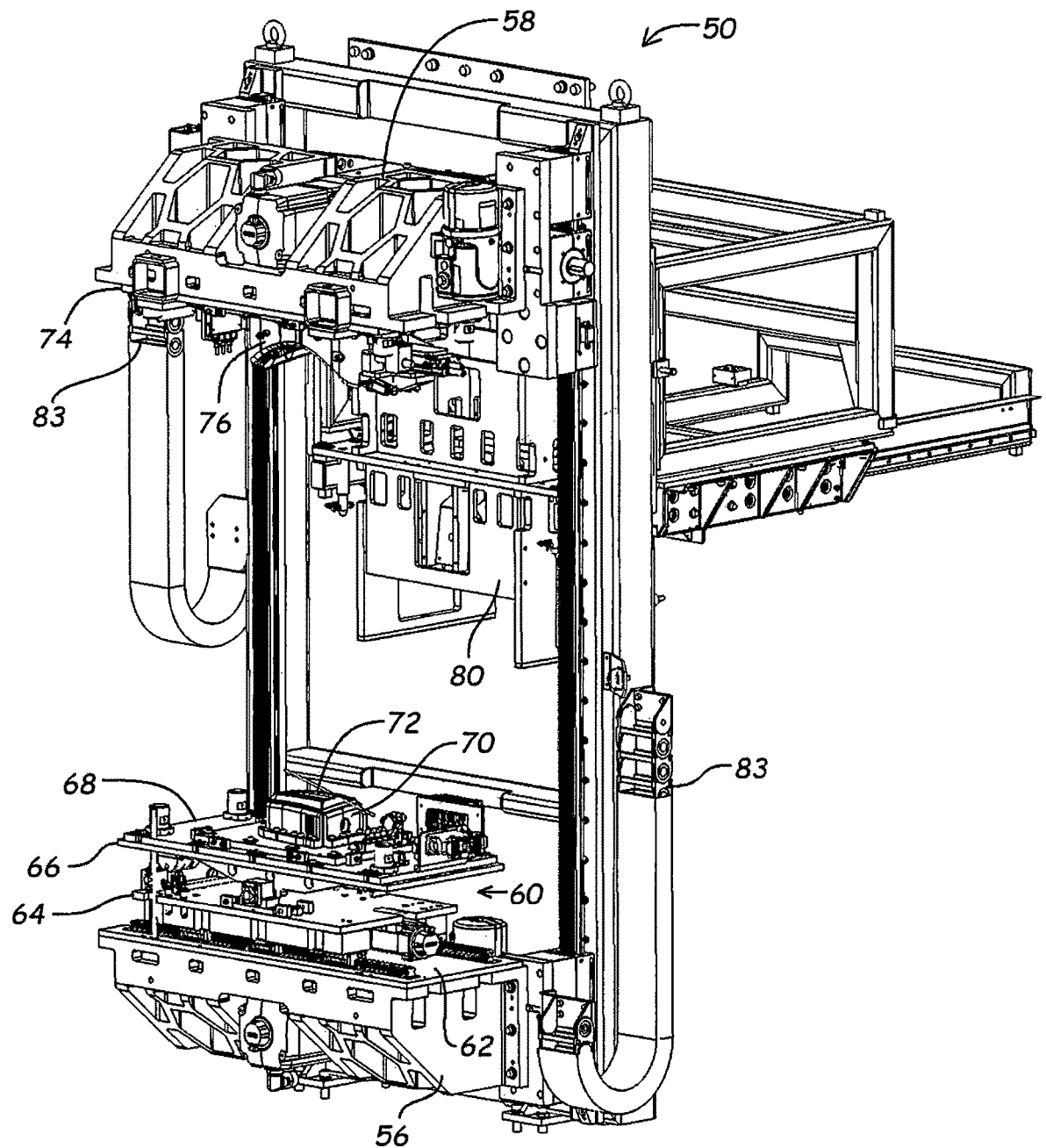
FIG. 9 is a perspective view of FIG. 8 with additional parts having been removed.

An embodiment of the disclosed welding machine 50 is shown in FIGS. 7-9. Machine 50 is housed within an enclosure 52 shown in FIG. 5 and is capable of controlling the welding process as explained in the immediately preceding paragraph to create a finished assembly of the welded parts having a strong weld joint.

Figure 6:
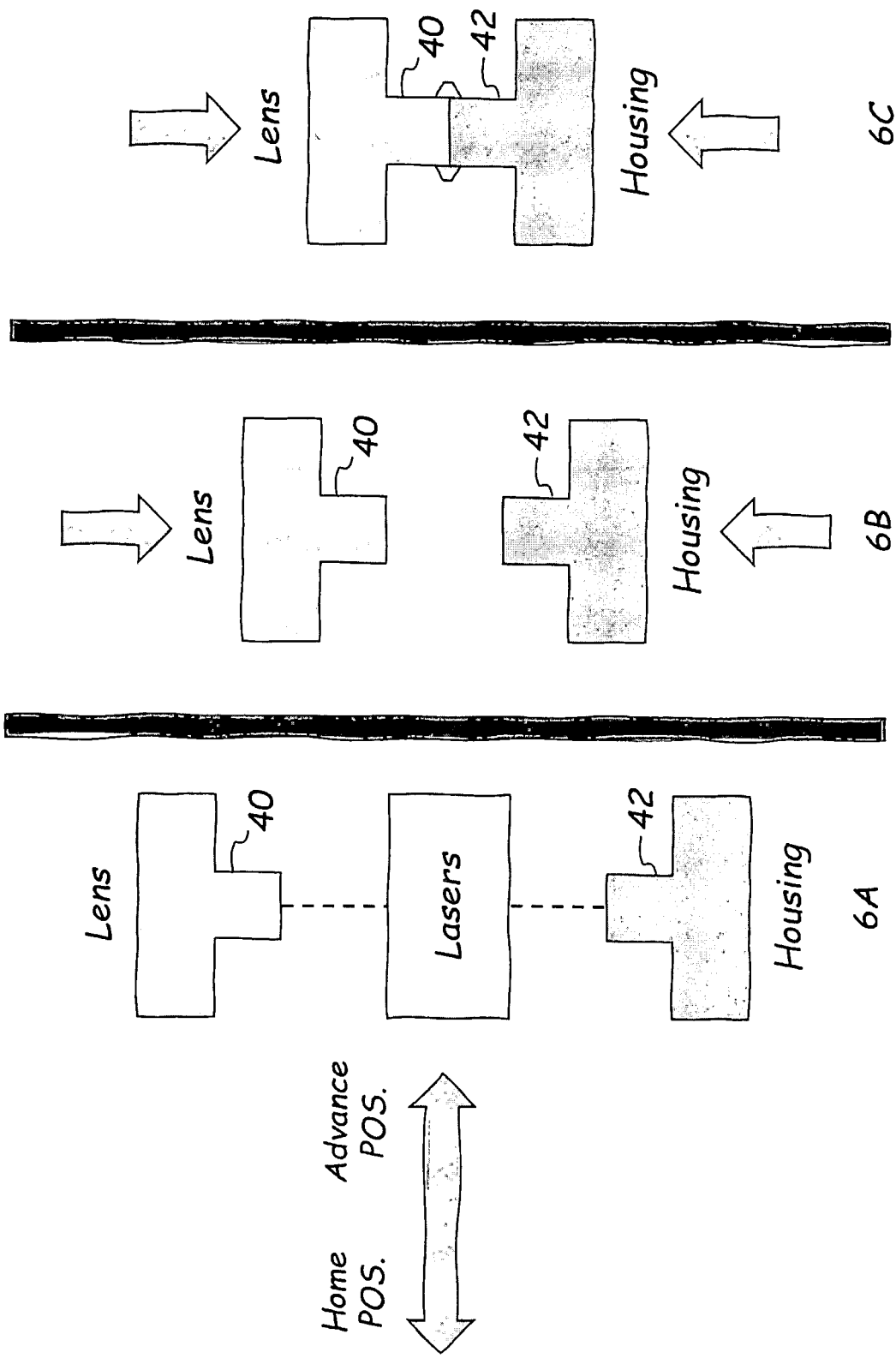
FIG. 6 is a diagram useful in explaining the DELW process.

Machine 50 employs the DELW process mentioned above. That process is explained with reference to FIG. 6 and its sections 6A, 6B, and 6C. Plastic lens 40 and plastic housing 42 are fixtured on respective tooling plates which are mounted on respective platens of the machine. The platens are positioned sufficiently far apart to enable a heat source, a laser system in this example, to be advanced from a home position to an advanced position between the platens. The lasers are then operated to melt surfaces of the two parts where the weld joint is to be created (FIG. 6A). When the surfaces are sufficiently melted, machine 50 moves one or both platens toward each other until their melt pools merge (FIGS. 6B,6C). The parts are held in position until the melt pools cool to solidification (FIG. 6C). Thereafter the platen or platens move away from each other and the assembly of the two parts can be removed from one of the fixtures which is holding the assembly.

Some of FIGS. 7-19 show machine 50 to comprise a structural framework 54 for supporting various assemblies and components of the machine.

FIGS. 7-10 show machine 50 to comprise a first (lower) platen 56 and a second (upper) platen 58 which are movable linearly vertically toward and away from each other on framework 54 in a direction parallel with an imaginary z-axis of a three-dimensional orthogonal system (Cartesian coordinate system).

A slide assembly 60 is mounted on platen 56. The slide assembly comprises a base plate 62 which is fastened to platen 56 and a slide plate 64 which is movable on base plate 62 linearly relative to both platens in a direction parallel with an imaginary x-axis of the three-dimensional orthogonal system.

A tilt plate 66 is mounted on x-axis slide plate 64 for tilting about a tilt axis parallel with an imaginary y-axis of the three-dimensional orthogonal system.

A first tooling plate 68 is fastened to tilt plate 66. A first fixture 70 for fixturing a first plastic part 72 is fastened to first tooling plate 68. A second tooling plate 74 is fastened to platen 58, and a second fixture 76 for fixturing a second plastic part 78 is fastened to second tooling plate 74. With the first plastic part 72 fixtured in first fixture 70, and second plastic part 78 fixtured in second fixture 76, first plastic part 72 can be independently moved relative to second plastic part 78 in each of three directions: 1) linearly in a direction parallel with the z-axis, 2) linearly in a direction parallel with the x-axis, and 3) circularly in an arc about an axis parallel with the y-axis.

A carriage 80 is supported on framework 54 via a carriage frame 81 for linear translation in a direction parallel with the y-axis. FIGS. 7-10 show carriage 80 in the home position of FIG. 6 while FIG. 11 shows carriage frame 81 having translated carriage 80 to the advance position. A prime mover bi-directionally translates the carriage from home position to advance position and from advance position to home position. More detail of carriage 80 and how it translates will be explained later in connection with FIGS. 38-40.

Figure 10:
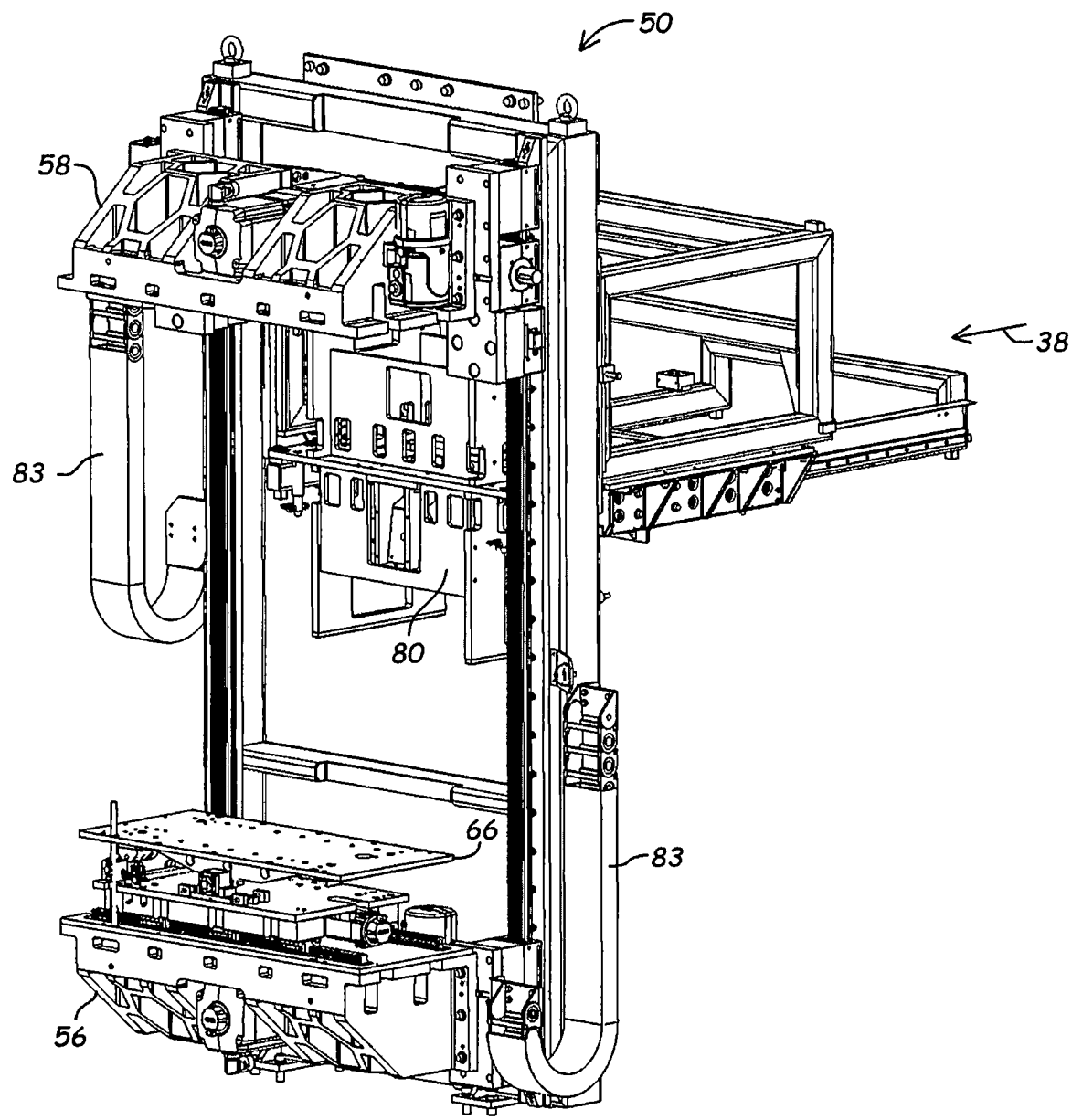
FIG. 10 is a perspective view of FIG. 9 with additional parts having been removed.
Figure 11:
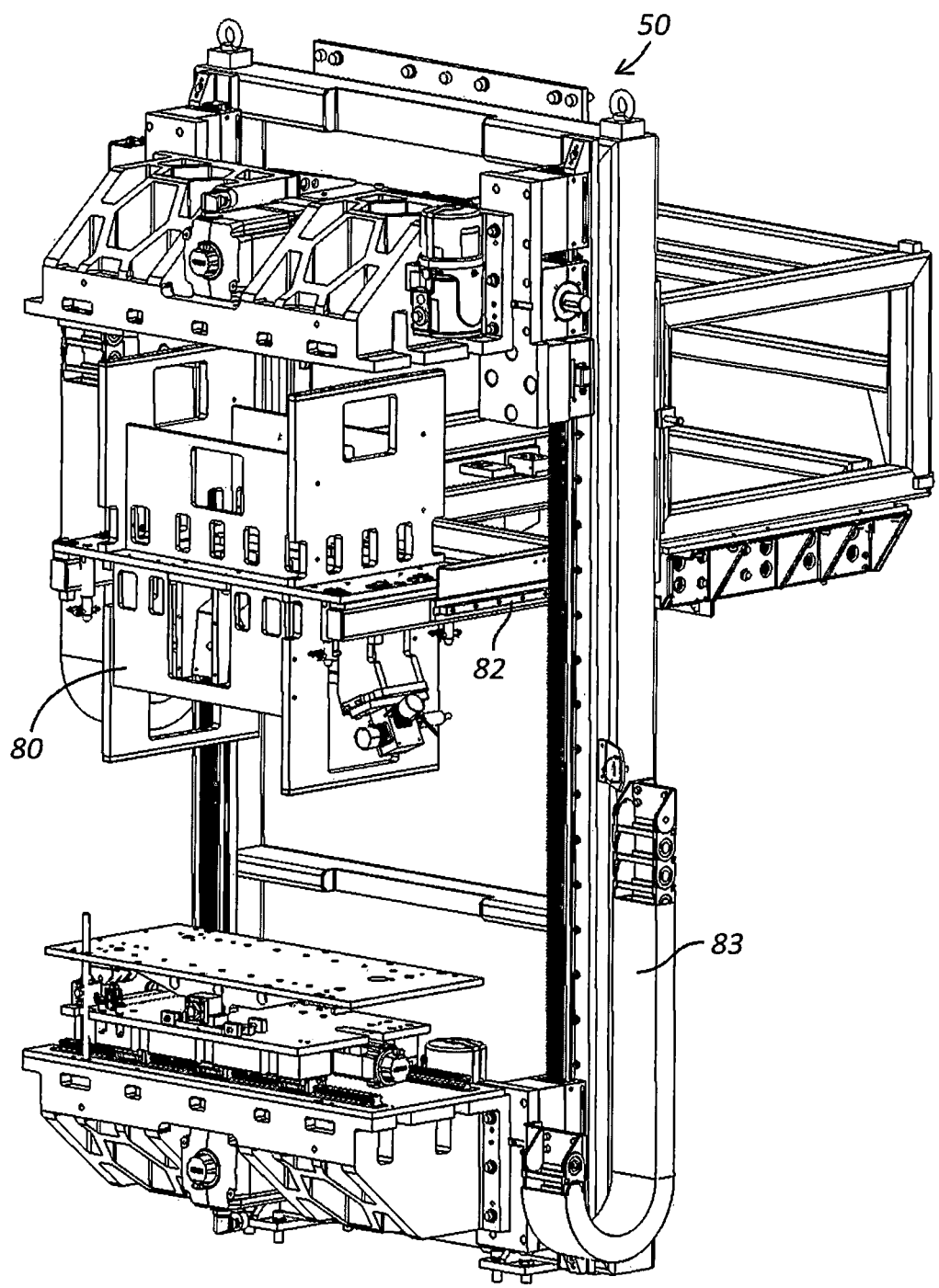
FIG. 11 is a view like FIG. 10 but with a movable carriage having been operated to a different position.

FIGS. 10-11 show machine 50 with the tooling plates 68, 74 having been removed from the platens. One or more arrays of lasers 82 is, or are, mounted on carriage 80. Various other devices for performing various functions of the machine are mounted on the carriage, on the platens, and/or on components mounted on the platens. Those devices are mostly electrical, but may be hydraulic and/or pneumatic. Such devices are connected by cables, conduits, wiring, etc. to controls of a control system and to power sources. Such connections are bundled together within flexible chain links, such as 83 in FIGS. 7-11, to flex with the chain links. One end of each the chain link is anchored to framework 54, and the opposite end to carriage 80 or a respective platen 56, 58.

FIGS. 12-19 and 34-37 show slide assembly 60 in greater detail. A pair of parallel rails 84, 86 are mounted on base plate 62. The rails' lengths run in directions parallel with the x-axis, and the rails are uniformly spaced apart in a direction parallel with the y-axis. Slide plate 64 is supported for travel on rails 84, 86 by linear bearings. Three linear bearings 88, 89, 90 support slide plate 64 on rail 84, and two linear bearings 92, 94 (FIG. 19) support slide plate 64 on rail 86. While all bearings serve the same purpose, bearings 92, 94 are different from bearings 88, 89, 90 because rail 84 has a different construction from rail 86.

A pinion box 96 is disposed between linear bearings 92, 94 and is mounted on base plate 62. The pinion box contains a pinion gear which is supported on the pinion box for rotation about an axis that is parallel with the y-axis. The pinion gear has teeth which are in engagement with teeth of a rack 98 which is mounted on rail 86, or alternately the teeth are formed in the rail. Rail 84 has no rack. A gearbox 100 is mounted on base plate 62 and has an output shaft which is coupled to an input shaft of the pinion within pinion box 96. Gearbox 100 also has an input shaft which is coupled through internal gears to the output shaft of the gearbox. The input shaft of gearbox 100 is coupled to an output shaft of a servo motor 102 which operates via the gearbox to rotate the pinion within the pinion box. By virtue of the engagement of the pinion's teeth with teeth of rack 98, slide assembly 60 can bi-directionally translate slide plate 64 on base plate 62 in a direction parallel with the x-axis when the servo motor operates. Rotation of the servo motor's output shaft in one sense translates the slide assembly in one direction, and rotation in an opposite sense, translates the slide assembly in an opposite direction. Stops 103 are mounted on base plate 62 at opposite ends of rail 86 and will be abutted by a part mounted on slide plate 64 to prevent accidental x-axis over travel of the slide plate.

Figure 12:
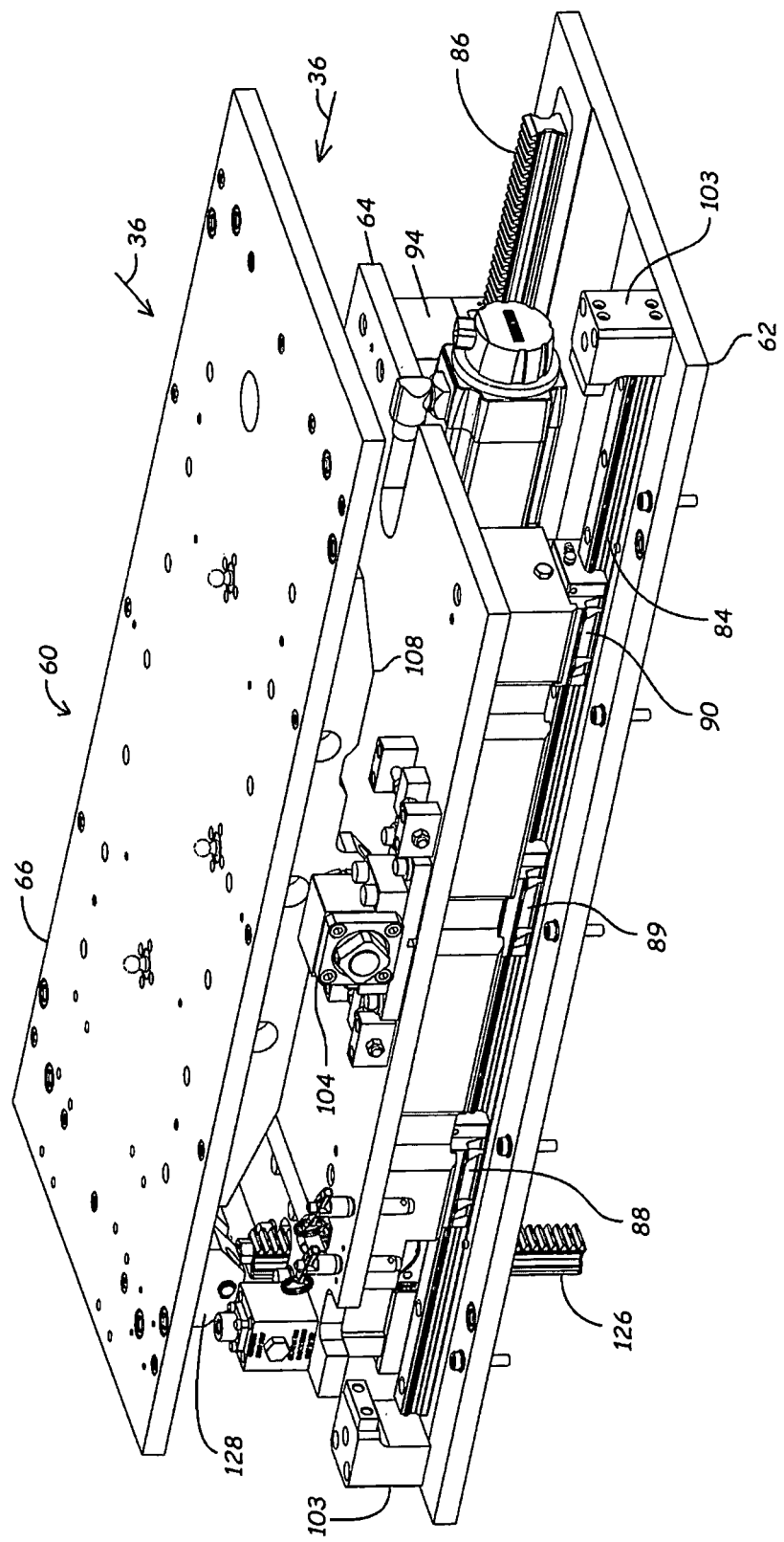
FIG. 12 is a perspective view of an assembly for imparting x-axis translation and arcuate y-axis turning to a plastic part when the plastic part is fixtured on the assembly.

Tilt plate bearings 104, 106 are mounted on the upper face of slide plate 64 at approximately the slide plate's midpoint in the x-axis direction. Two support bars 108, 110 for tilt plate 66 are mounted on the bottom face of tilt plate 66 (see FIGS. 35, 36). The support bars support the tilt plate for turning in a circular arc about an axis which is parallel with the y-axis, as will be explained in greater detail below. FIG. 12 shows the slide plate at a midpoint of its x-axis travel and the tilt plate horizontal. FIGS. 13-18 show the tilt plate tilted in one direction.

Figure 13:
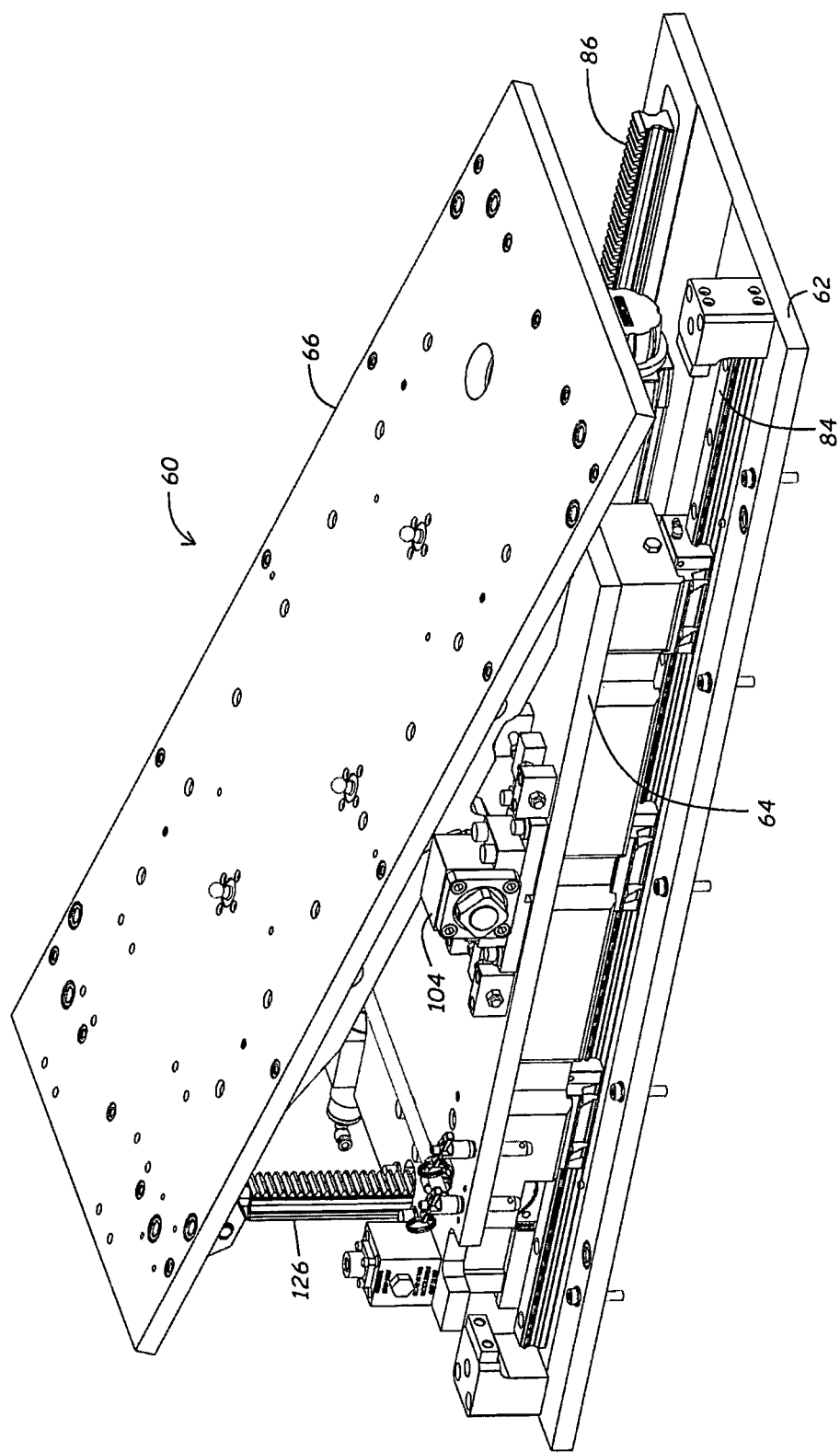
FIG. 13 is a perspective view illustrating a tilt plate of the assembly having been tilted from the position shown in FIG. 12.

FIG. 13 shows the slide plate at the midpoint of its travel along the x-axis.

Figure 14:
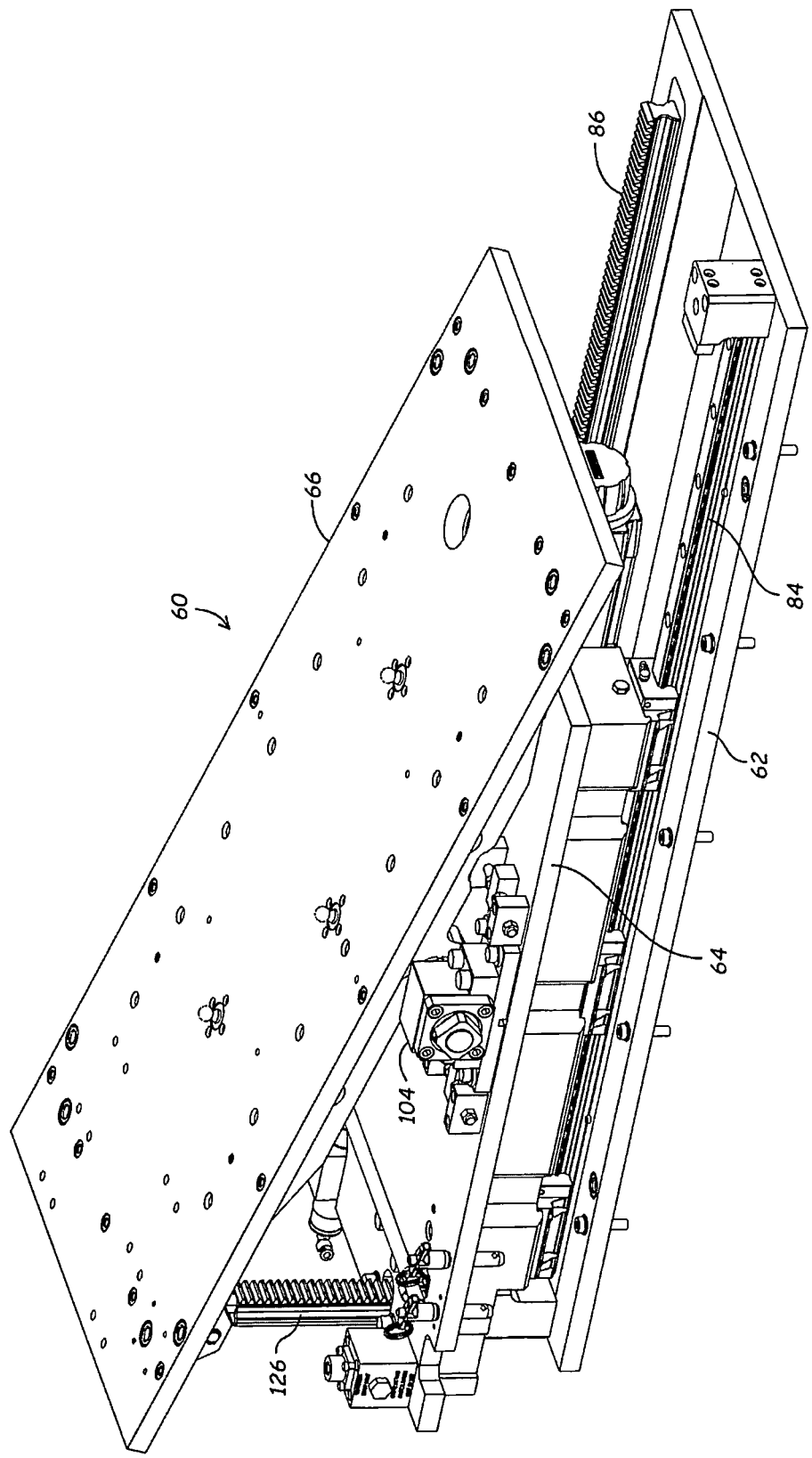
FIG. 14 is a perspective view illustrating x-axis translation in one direction from the x-axis position shown in FIG. 13.

FIG. 14 shows the slide plate at one limit of its x-axis travel.

Figure 15:
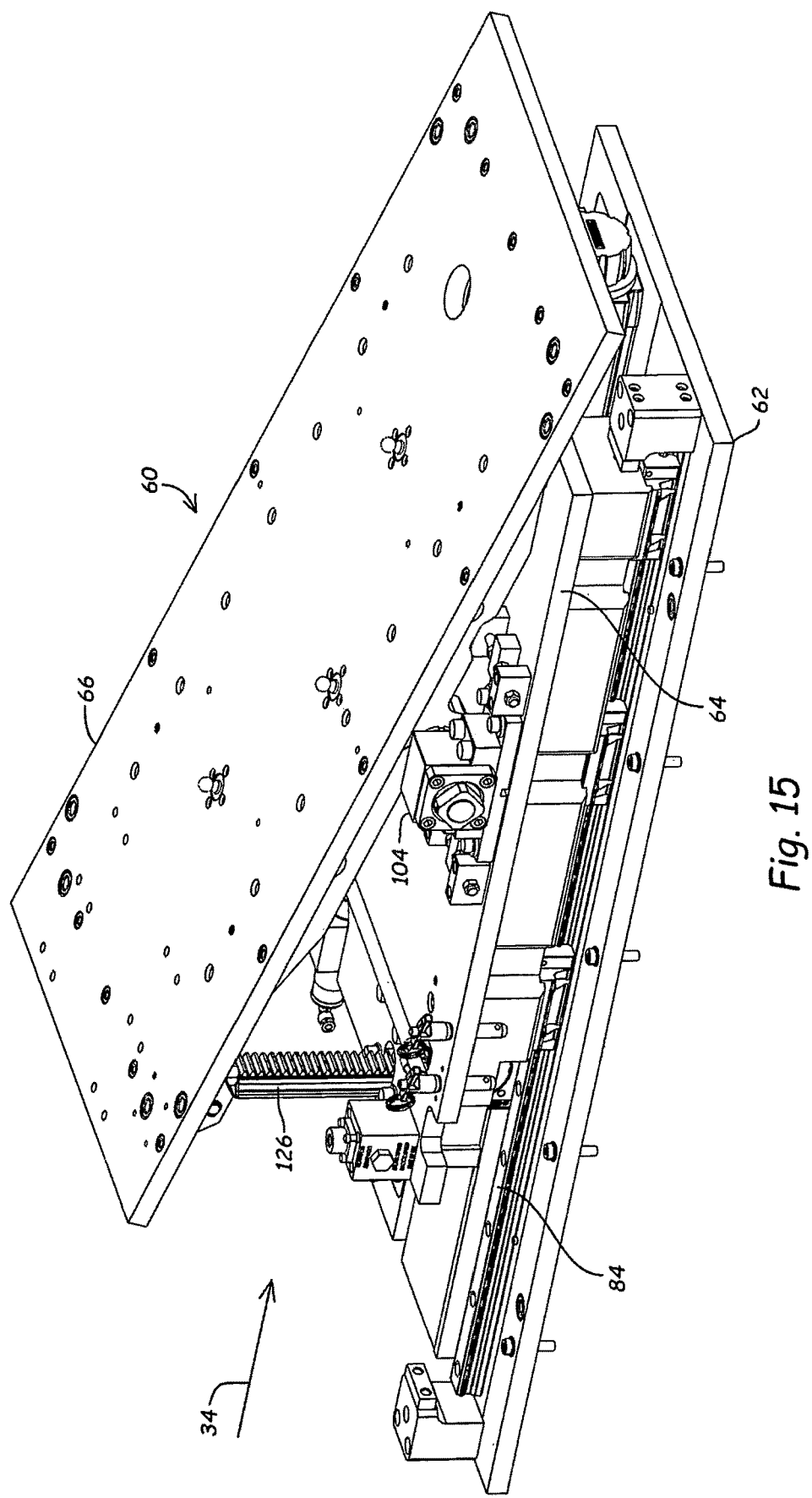
FIG. 15 is a perspective view illustrating x-axis translation in the opposite direction from the x-axis position shown in FIG. 13.
Figure 16:
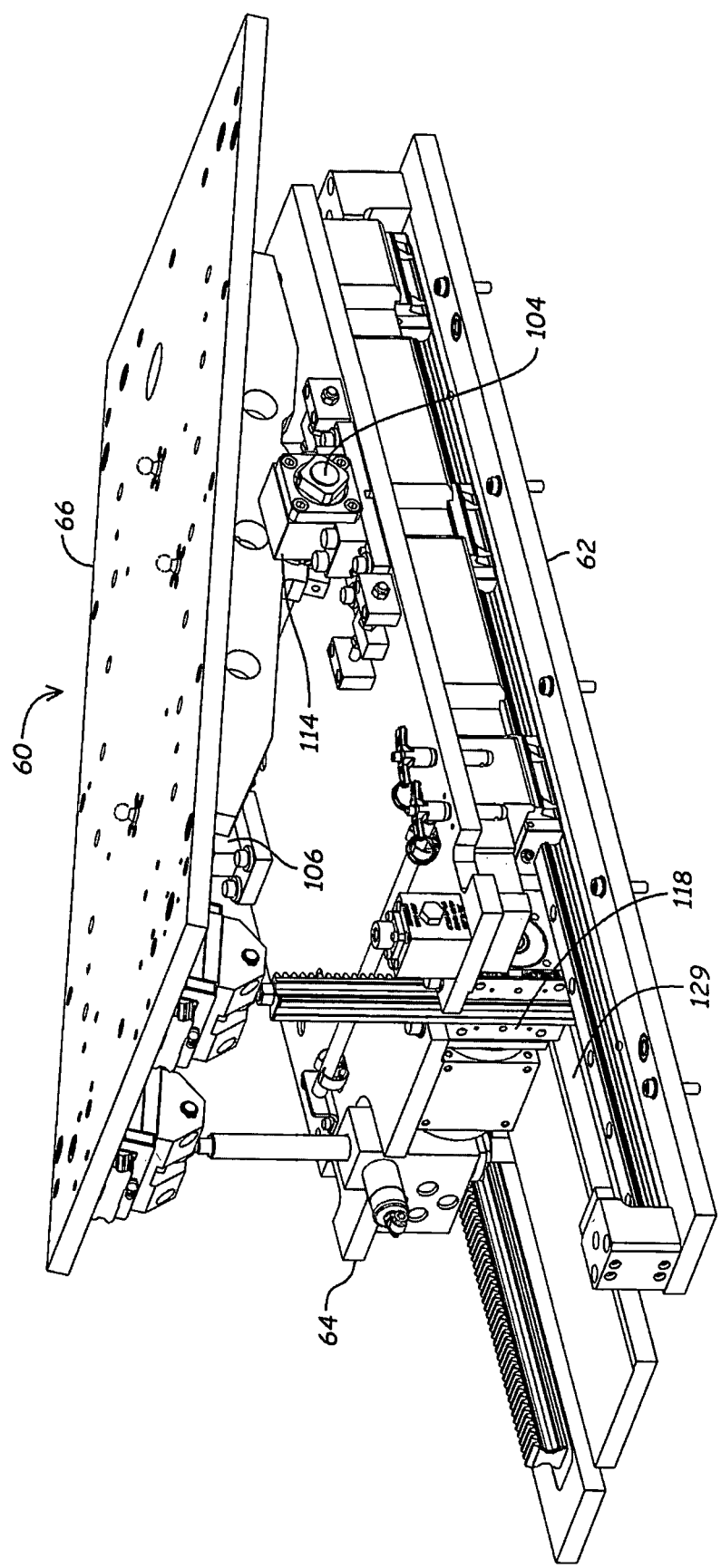
FIG. 16 is a perspective view of FIG. 15 from a different direction.
Figure 17:
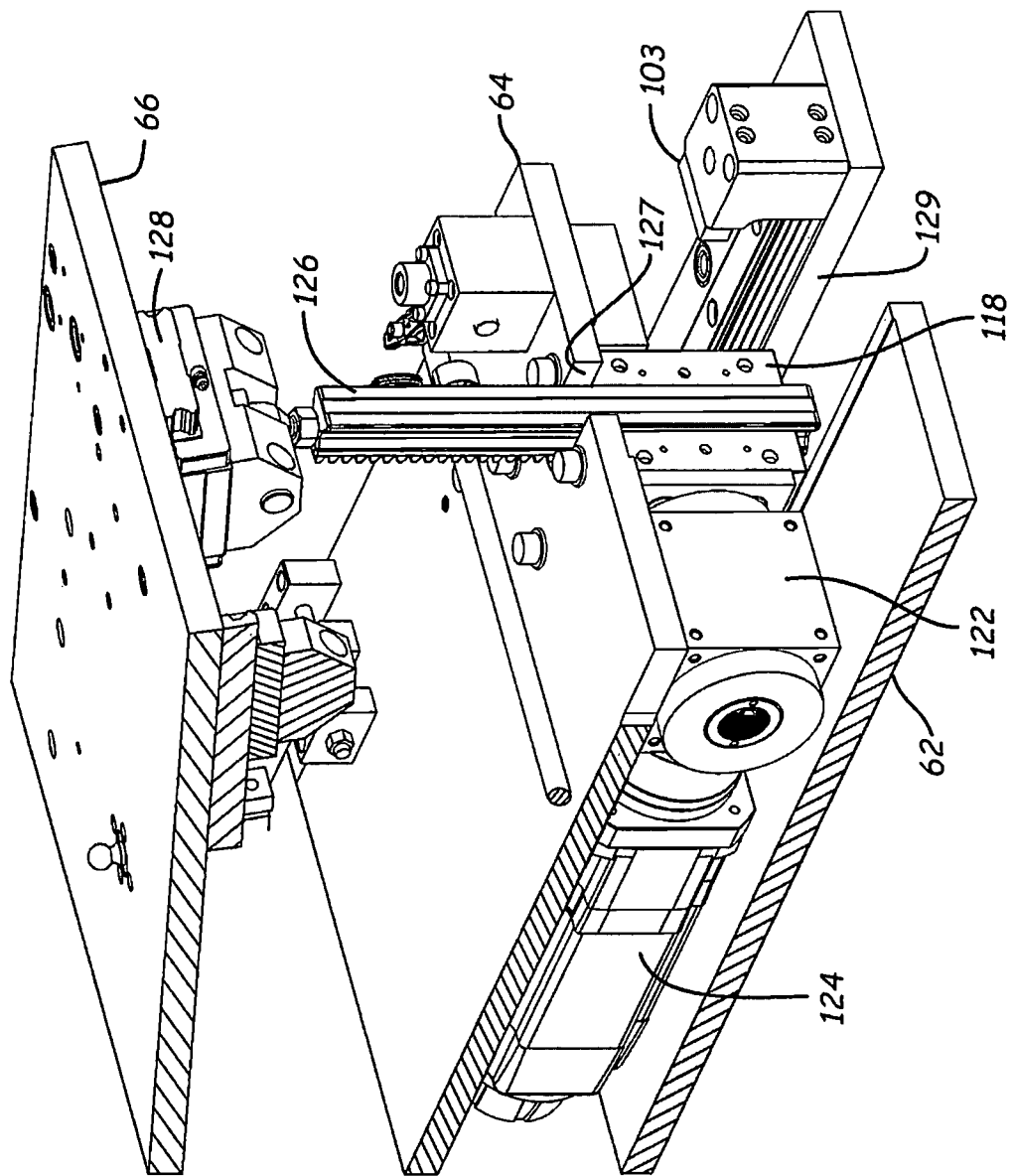
FIG. 17 is an enlarged fragmentary perspective view of one portion of FIG. 16 from a different direction.
Figure 18:
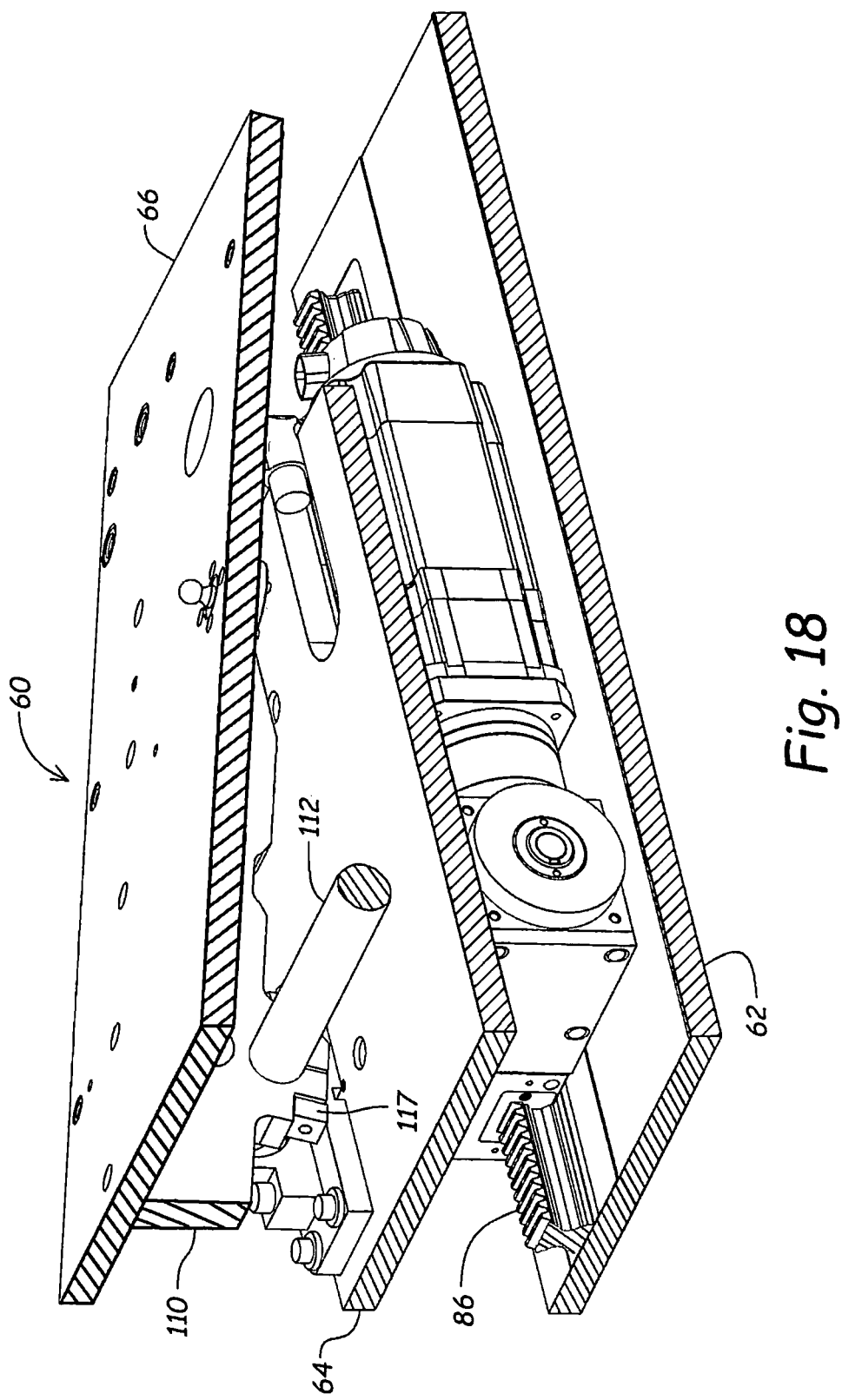
FIG. 18 is an enlarged fragmentary perspective view of another portion of FIG. 16.
Figure 19:
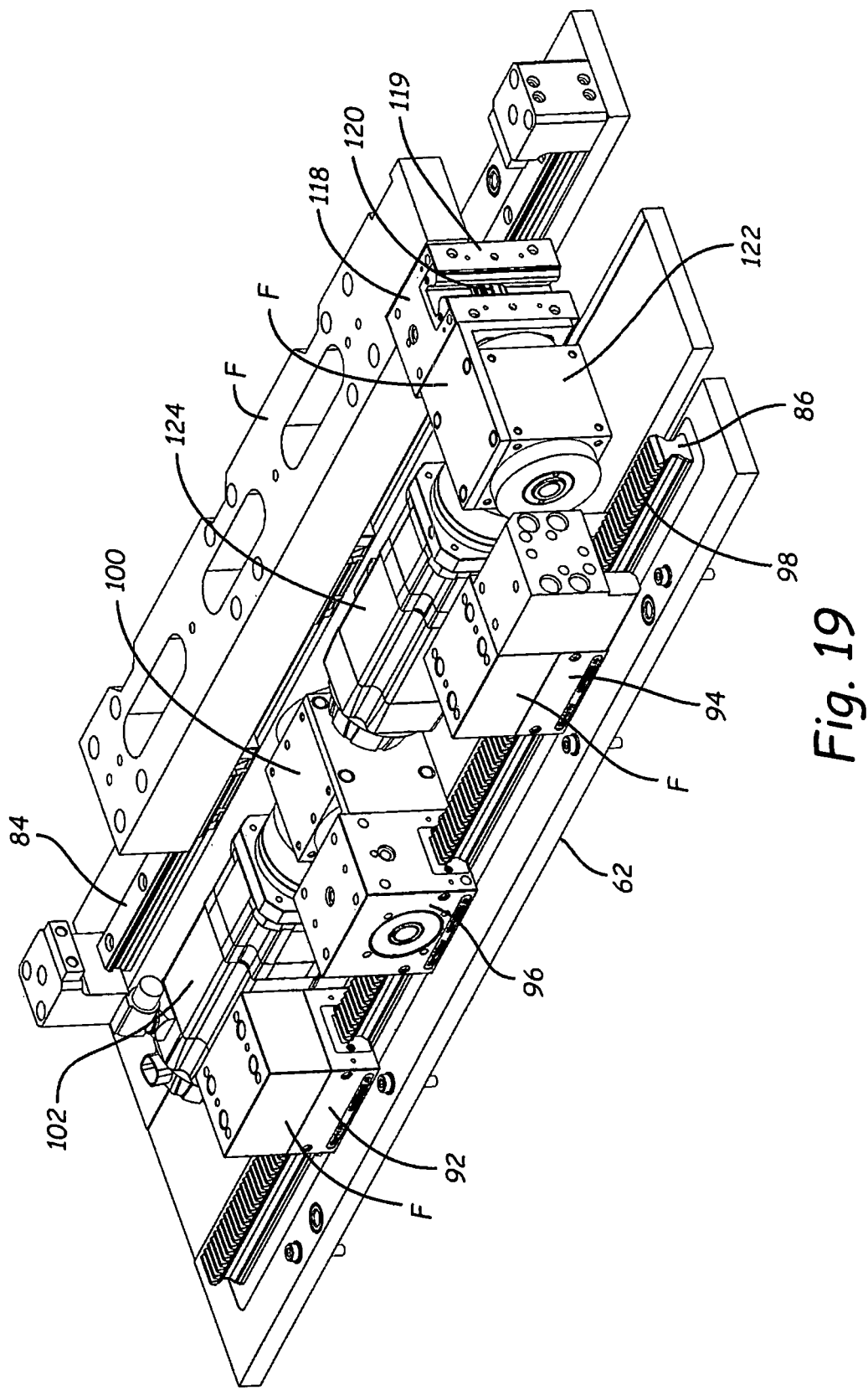
FIG. 19 is a perspective view of a drive system for performing x-axis translation and y-axis turning.

FIG. 15 shows the slide plate at an opposite limit of its x-axis travel.

Figure 42:
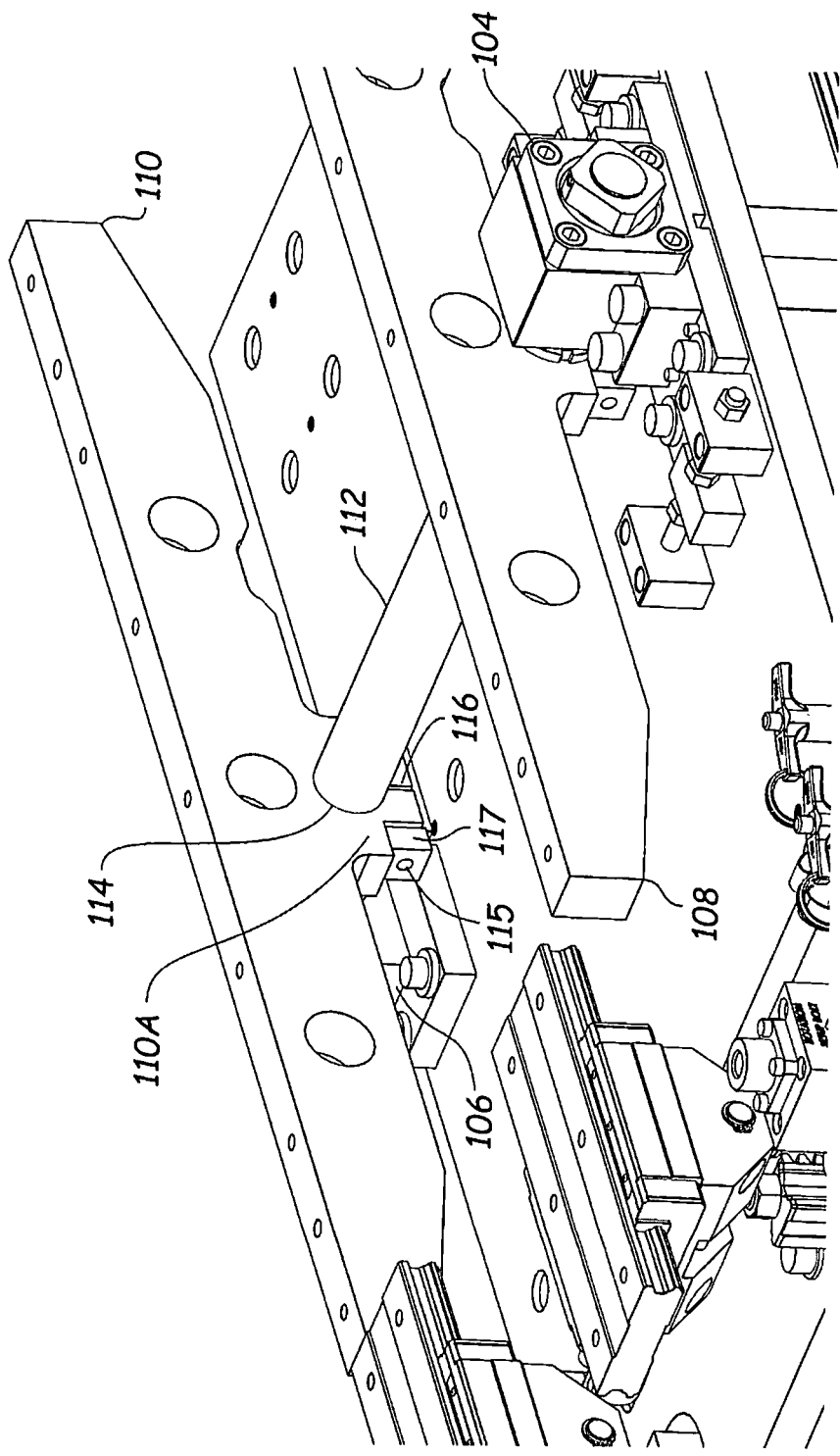
FIG. 42 is an enlarged fragmentary view of a portion of FIG. 34 with some parts having been removed.

FIG. 42 shows bearings 104, 106 which journal opposite ends of a circular stainless steel shaft 112 extending between them. The shaft passes through aligned circular through-holes 114 in the support bars although only one through-hole can be seen in the view of FIG. 42. A thin slot 116 extends radially from the through-hole in each support bar to a surface of the bar opposite the through-hole. The shaft fits snuggly within the through-holes but the presence of the radial slots 116, and the nature of the support bar material, aluminum in this instance, allow the circular surfaces of the through-holes to be clamped tight onto the shaft by respective steel bolts 115 whose shanks pass through two aligned holes extending through each support bar on opposite sides of slot 116. Each bolt has a head which bears against an outside surface of the support bar at an end of one of the aligned holes opposite slot 116. Each bolt's shank passes completely through the aligned holes and threads into a steel nut 117 disposed against an outside surface of the support bar opposite the surface against which the bolt head bears. The nut is constrained against turning by an overhang 110A in the support bar. Tightening of each bolt forces the bolt head and the nut toward each other against the outside surfaces of the support bar against which they are disposed, and that tightening clamps the support bars onto the shaft so that the tilt of tilt plate 66 turns in correlation with the turning of shaft 112 about the shaft's axis.

Tilting of tilt plate 66 is performed through a pinion box 118 (see FIG. 19) having a housing 119 which is mounted on slide plate 64. Housing 119 contains a pinion 120 which is supported by the housing for rotation about an axis that is parallel with the y-axis. A gearbox 122 is mounted on slide plate 64 and has an output shaft which is coupled to an input shaft of pinion 120. Gearbox 122 also has an input shaft which is coupled through internal gears to the output shaft of a servomotor 124 which is operable via gearbox 122 to rotate pinion 120.

The flat top surface of housing 119 of pinion box 118 lies in a horizontal plane which is higher than the tops of all other components mounted on base plate 62. Filler pieces F are mounted on certain other components as marked in FIG. 19 and other Figs. The flat top surfaces of those filler pieces lie in the same plane as that of the top surface of housing 119 to provide support for slide plate 64.

FIGS. 12-17 and 19 show teeth of pinion 120 meshing with teeth of a vertical rack 126 which is guided by housing 119 for vertical translation relative to both slide plate 64, on which housing 119 is mounted, and also base plate 62. The slide plate and the base plate have respective clearance slots 127, 129 through which rack 126 passes. Like pinion box 96, a through-slot in housing 119 allows teeth of pinion 120 to protrude from the housing and mesh with teeth of rack 126. When servomotor 124 rotates pinion 120 in one sense, rack 126 translates upwardly, and when servomotor 124 rotates pinion 120 in an opposite sense, rack 126 translates downwardly.

FIGS. 34-37 show a clevis joint 128 coupling the upper end of rack 126 with tilt plate 66 near one corner of the tilt plate. The clevis joint has a housing 130 which can turn on the rack about an axis 132 which is parallel with the y-axis. Opposite its connection with rack 126, clevis housing 130 has a slide 134 which can slide along a track 136 fastened to the lower face of tilt plate 66. That arrangement allows clevis housing 130 to slide along track 132 as rack 126 translates vertically up and down relative to base plate 62 and slide plate 64. Vertically upward translation increases the tilt of the tilt plate, and vertically downward translation decreases the tilt.

A rod lock cylinder 138 is located near the widthwise opposite corner of the tilt plate. Cylinder 138 has a clevis joint 140 like clevis joint 128. The clevis joint can slide along a track 142 fastened to the lower face of the tilt plate. The cylinder's body is supported vertically upright on the slide plate. A rod 144 extends vertically from the cylinder body and connects to clevis joint 140. When tilt plate 66 is to be turned, rod 144 is unlocked and can extend and retract with turning of the tilt plate. When tilt plate 66 is in a desired position, rod 142 is locked and can neither extend nor retract, thereby aiding in support of the tilt plate. An example of rod lock cylinder 138 is sold by Festo USA, having an office in Troy, Michigan, USA.

Figure 20:
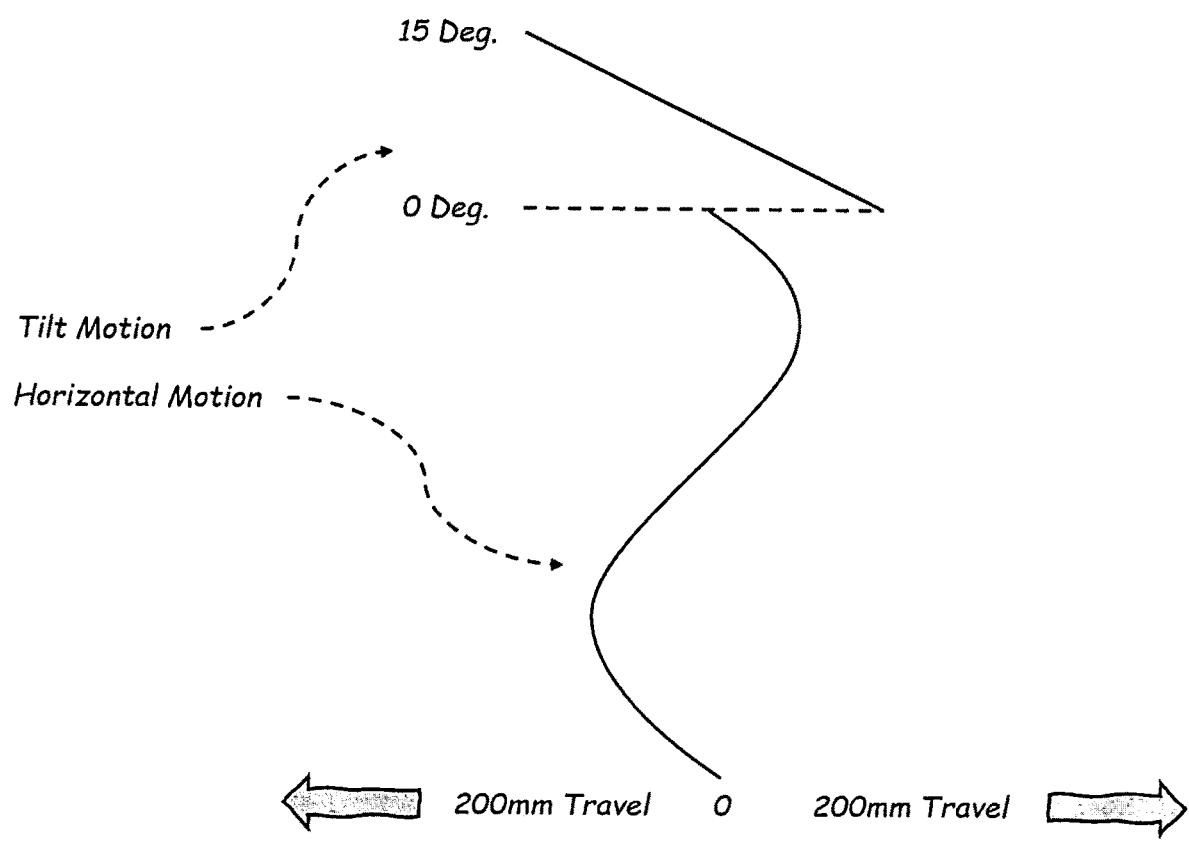
FIG. 20 is a diagram for use in explaining kinematics of motion which the assembly of FIG. 12 can impart to a fixtured plastic part.

FIG. 20 shows ranges of travel of slide plate 64 in a direction parallel with the x-axis and of turning of tilt plate 66 about an axis parallel with the y-axis. Slide plate 64 can travel 200 mm in either direction from the center of its range of travel. Tilt plate 66 can turn over a range from 0° when horizontal, as in FIG. 12, to 15° clockwise, as in FIGS. 13-18. If counterclockwise turning is needed, then the tilt plate can be repositioned on the slide plate by unfastening the tilt plate from the side plate, turning the tilt plate 180° about a vertical axis, and then refastening the tilt plate to the slide plate.

FIGS. 22-29 showing a welding machine 50A which is used to perform TTL welding. Machine 50A differs from machine 50 in that only platen 56 can travel in a direction parallel with the z-axis because platen 58 is fastened to the machine framework 54 and hence is incapable of travel in a direction parallel with the z-axis. In machine 50A, the same assemblies and components as in machine 50 are mounted on platen 56 and are identified by the same reference numerals. Lasers 82 are still mounted on carriage 80, however the carriage is fastened directly to the machine framework and hence does not move.

Figure 21:
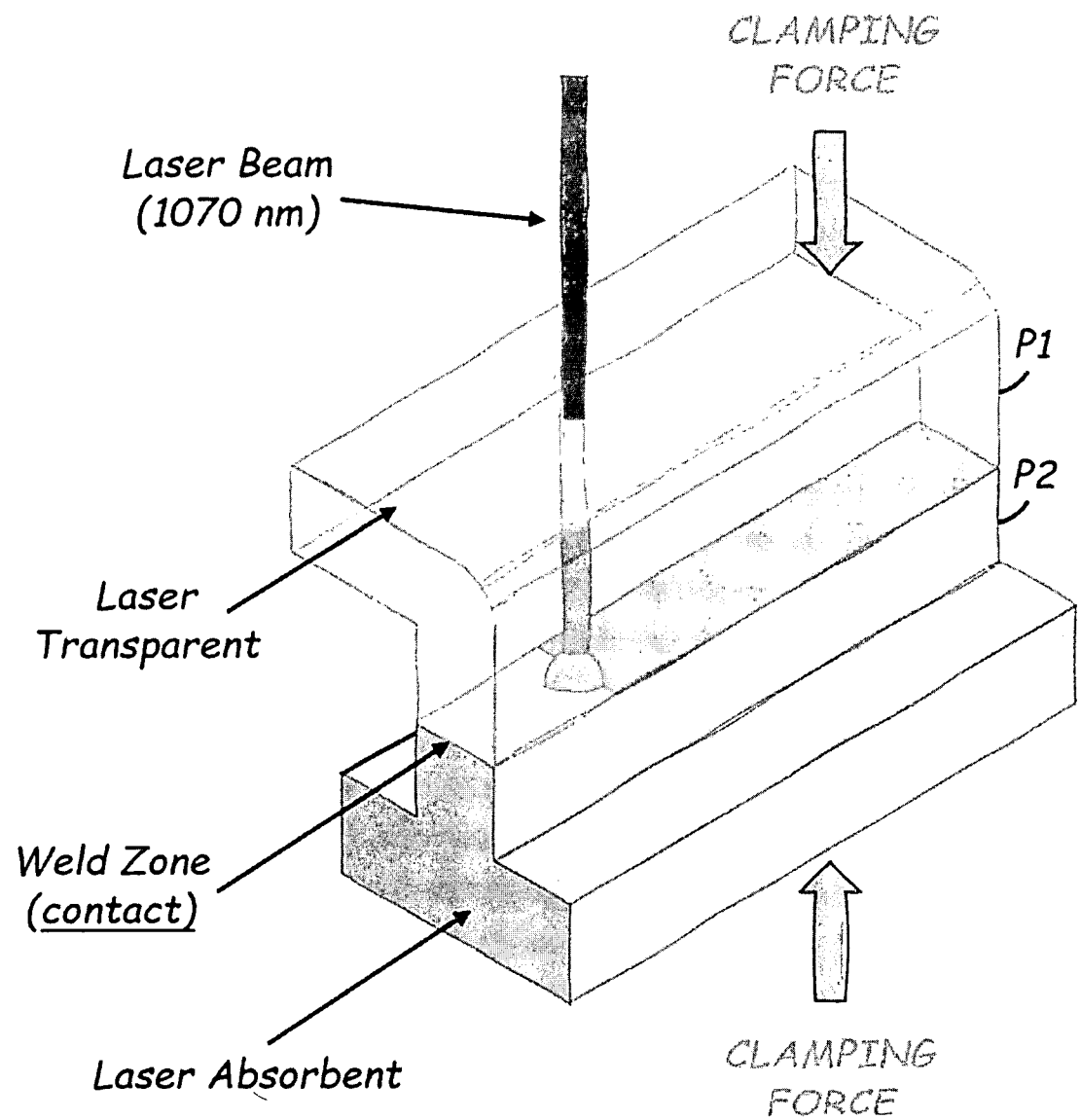
FIG. 21 is a diagram for use in explaining the TTW process.
Figure 22:
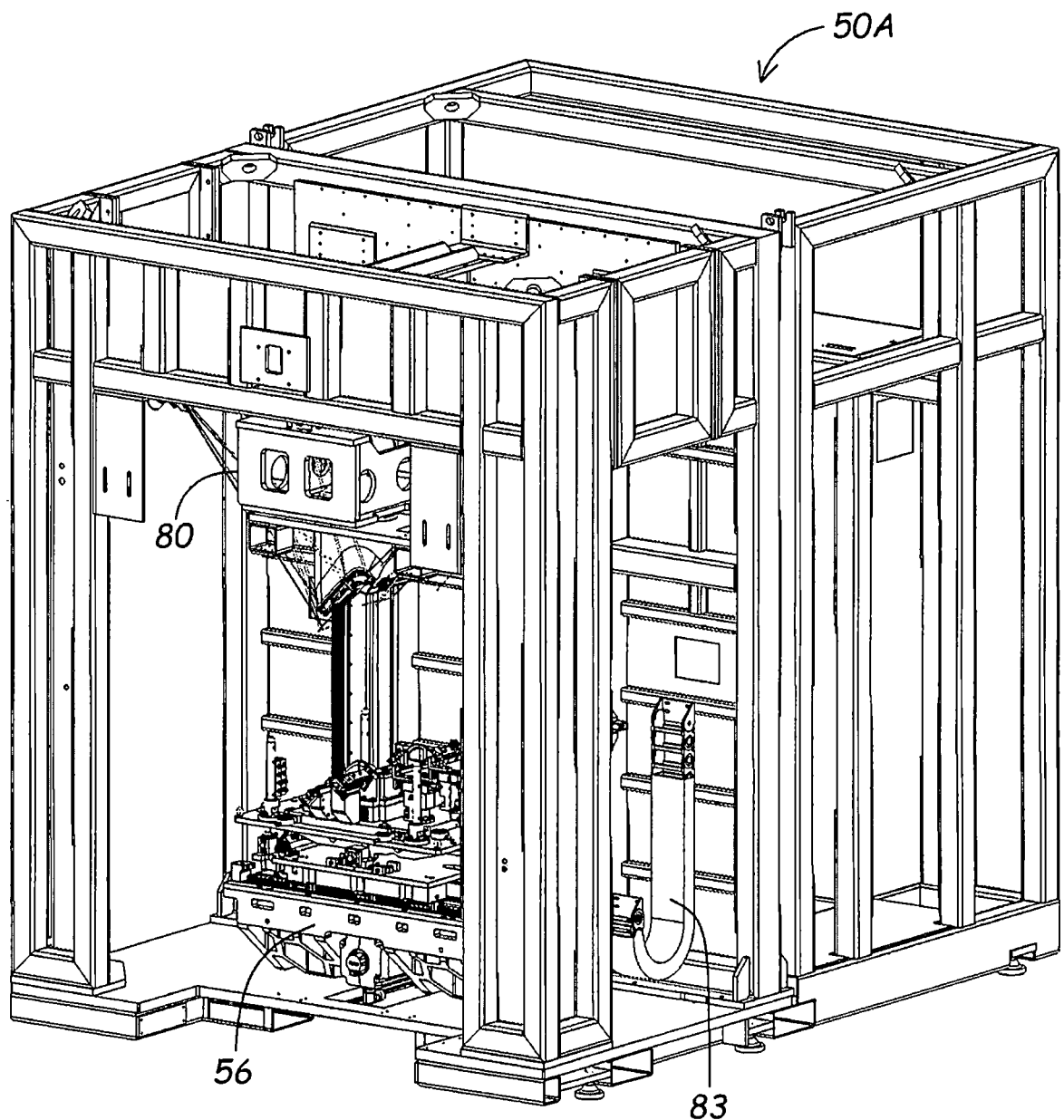
FIG. 22 shows a welding machine for performing the TTW process housed within an enclosure like the one in FIG. 5.
Figure 23:
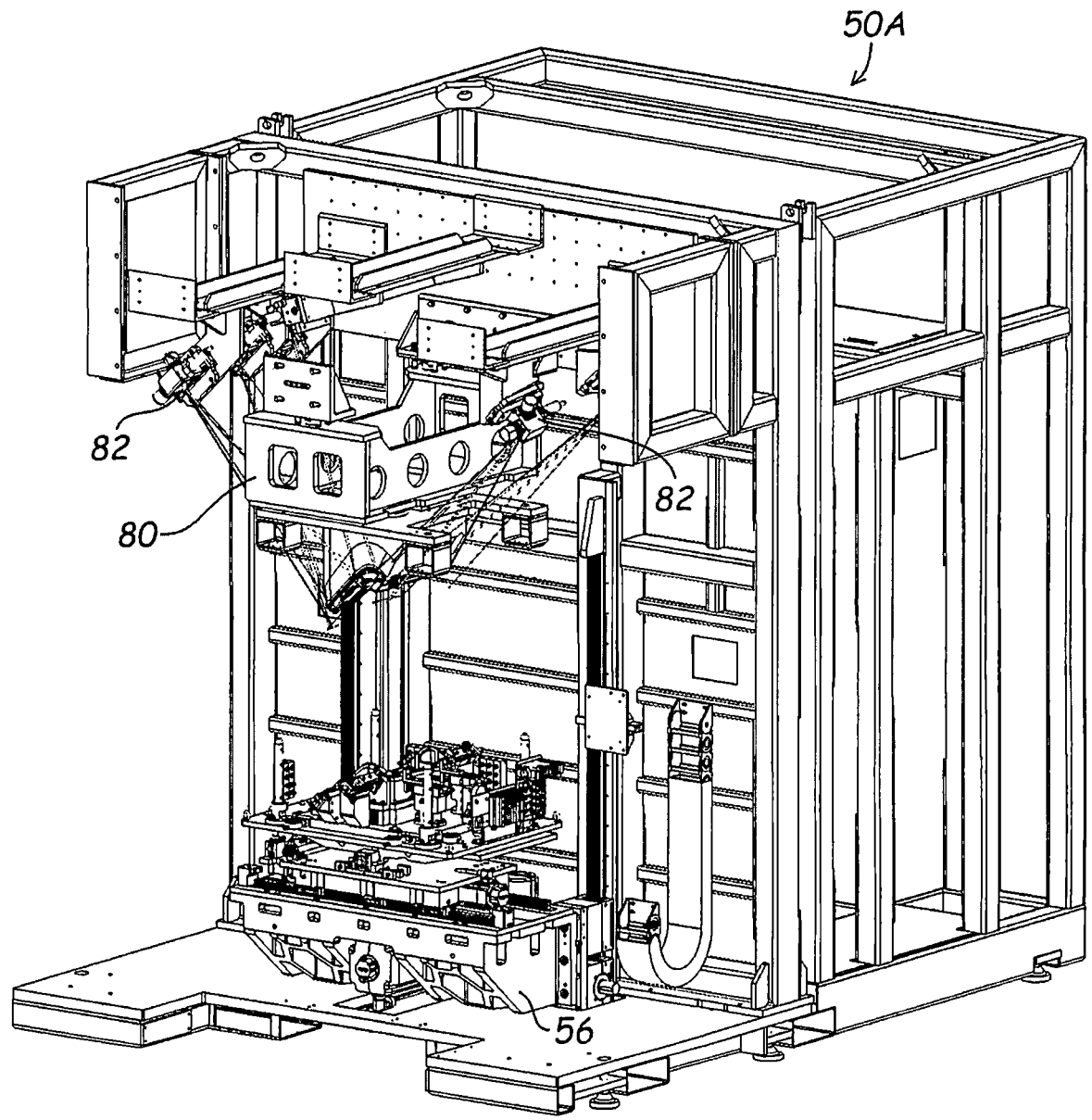
FIG. 23 is a perspective view of FIG. 22 with some parts having been removed for more completely illustrating certain parts which are not fully seen in FIG. 23.
Figure 24:
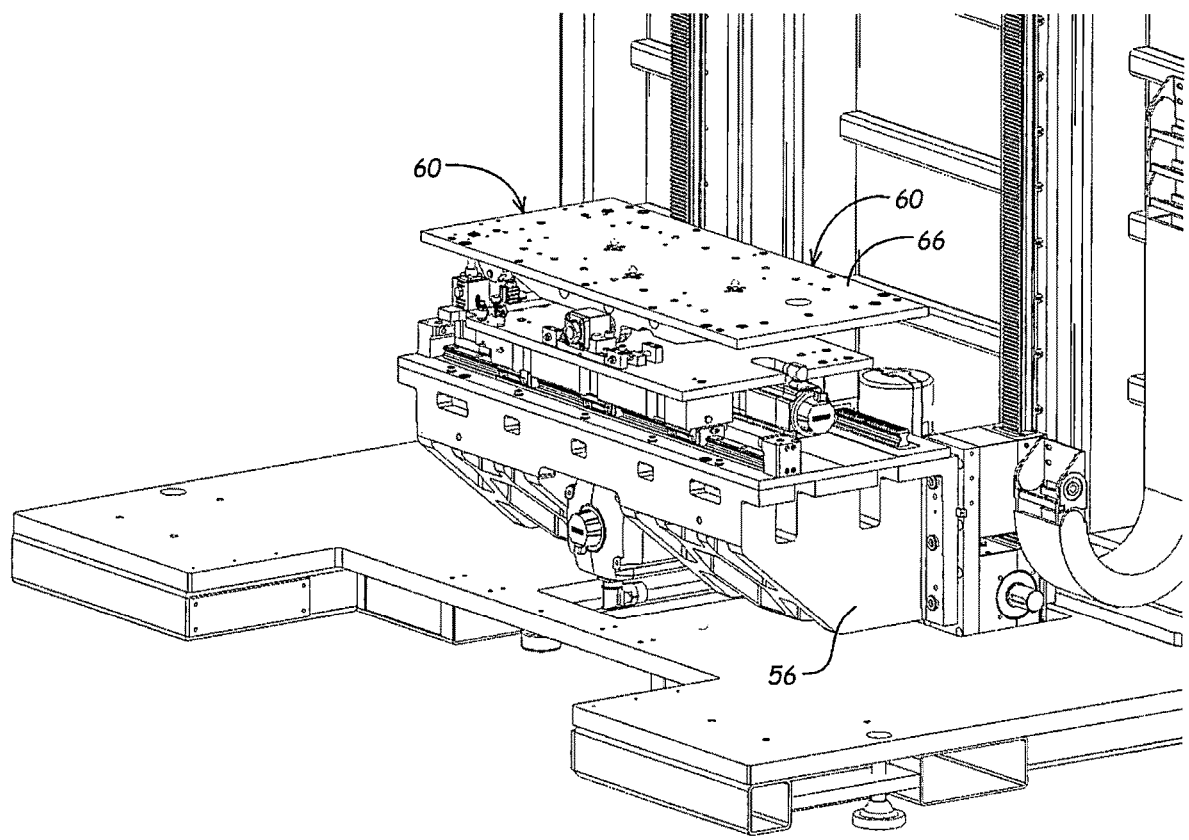
FIG. 24 is an enlarged view of a lower portion of FIG. 23 with some parts having been removed.
Figure 25:
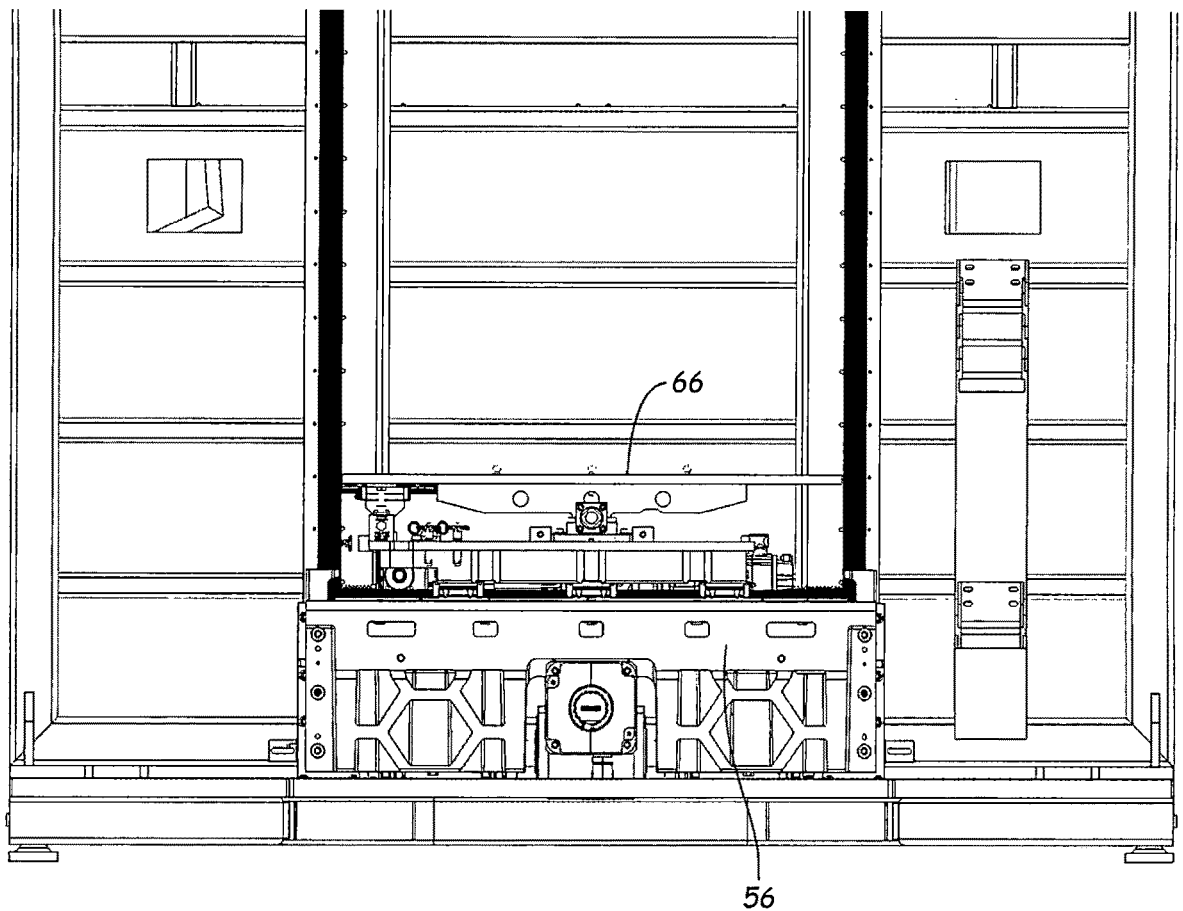
FIG. 25 is a front view of FIG. 24.
Figure 26:
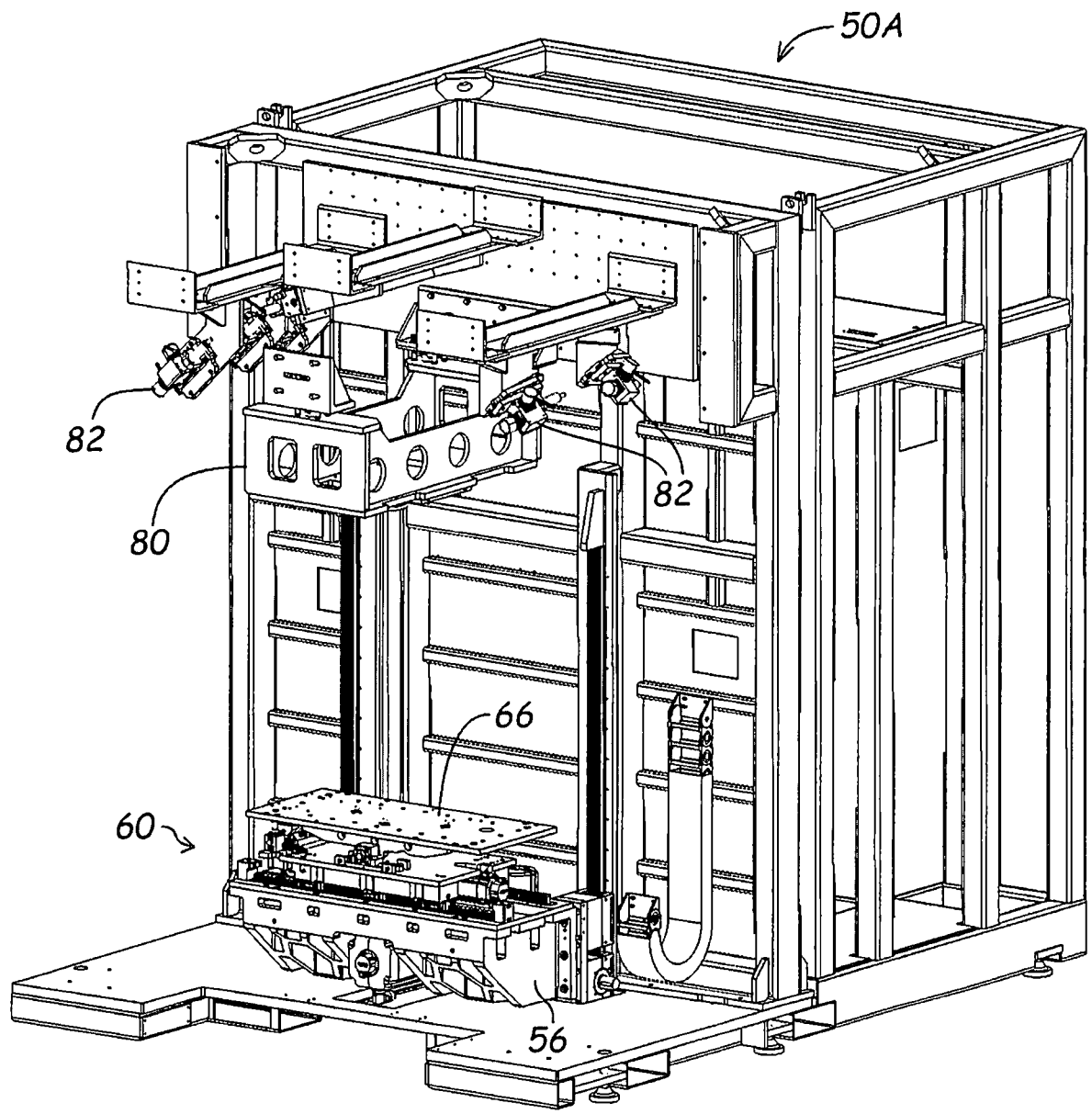
FIG. 26 is a perspective view of FIG. 23 with some parts having been removed.
Figure 27:
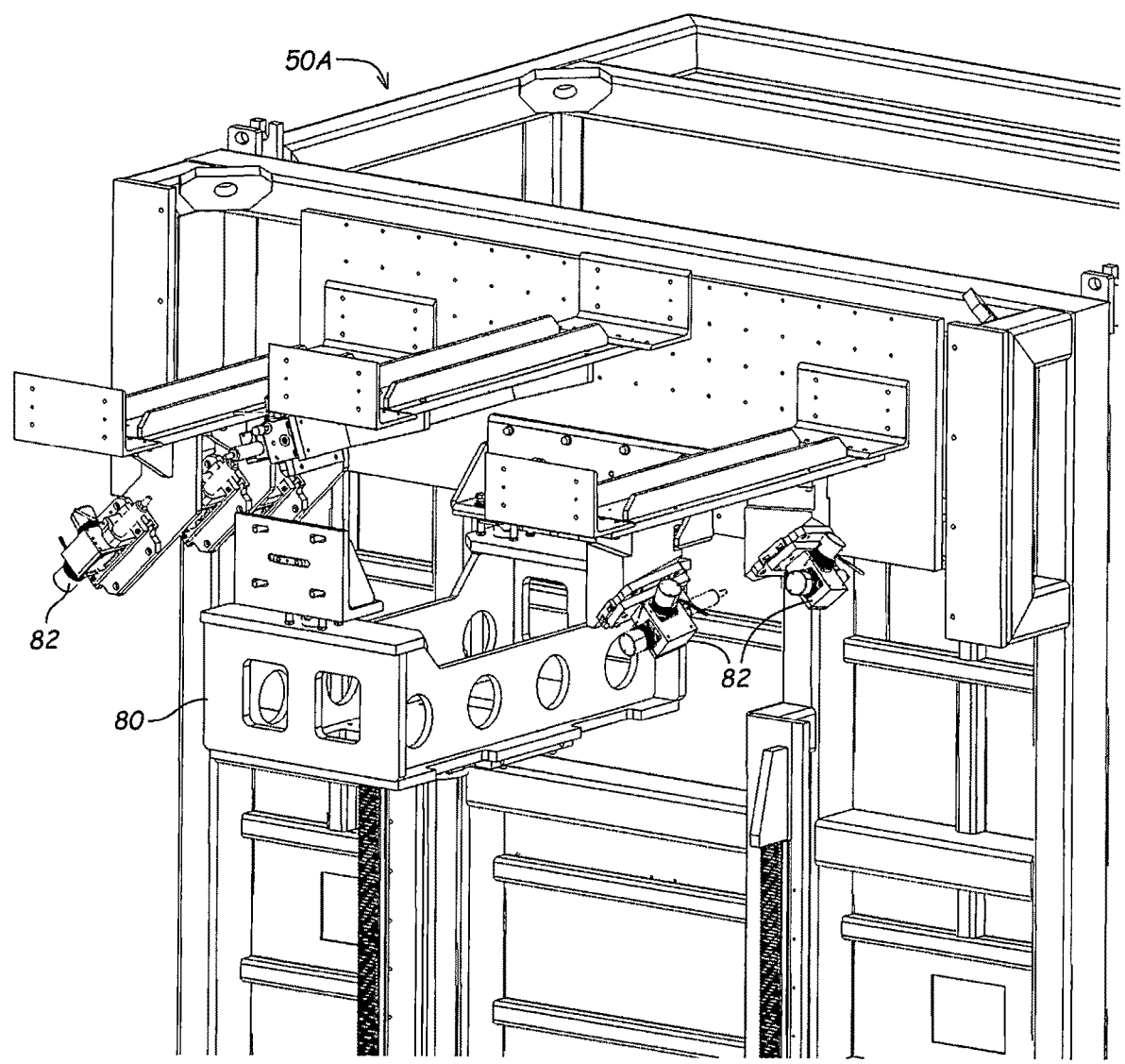
FIG. 27 is an enlarged fragmentary view of an upper portion of FIG. 26.
Figure 28:
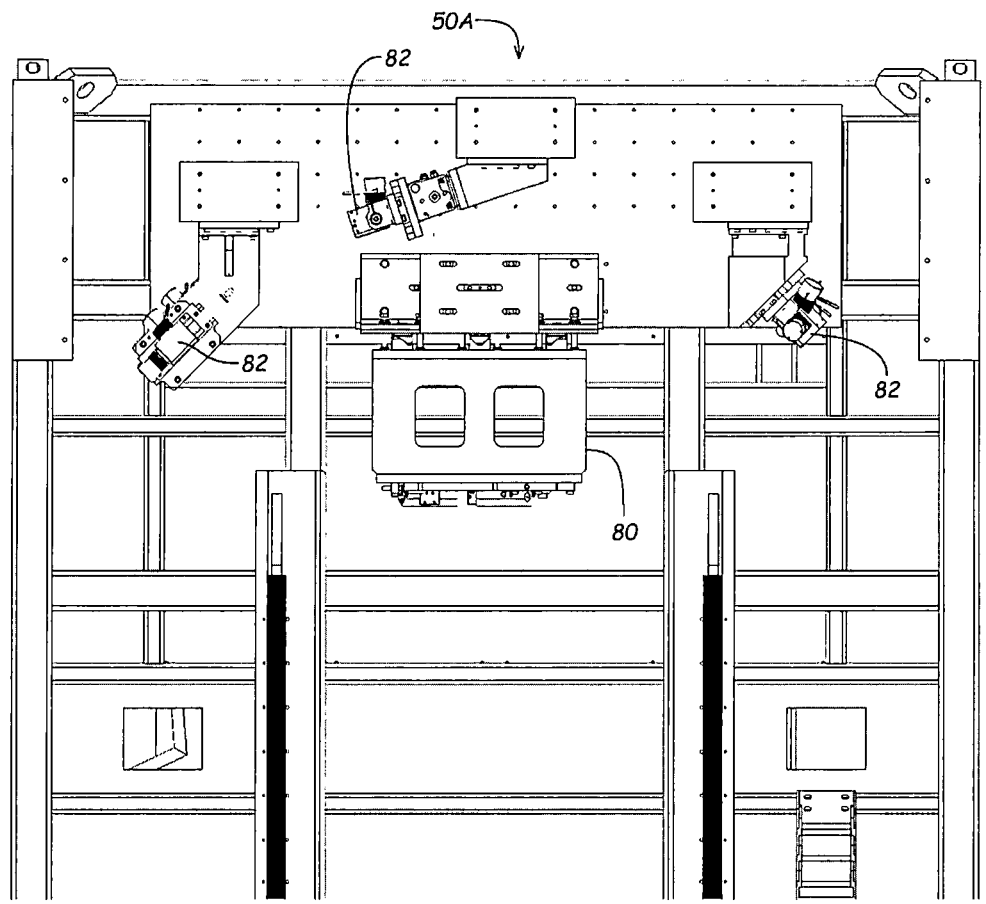
FIG. 28 is a front view of FIG. 27.
Figure 29:
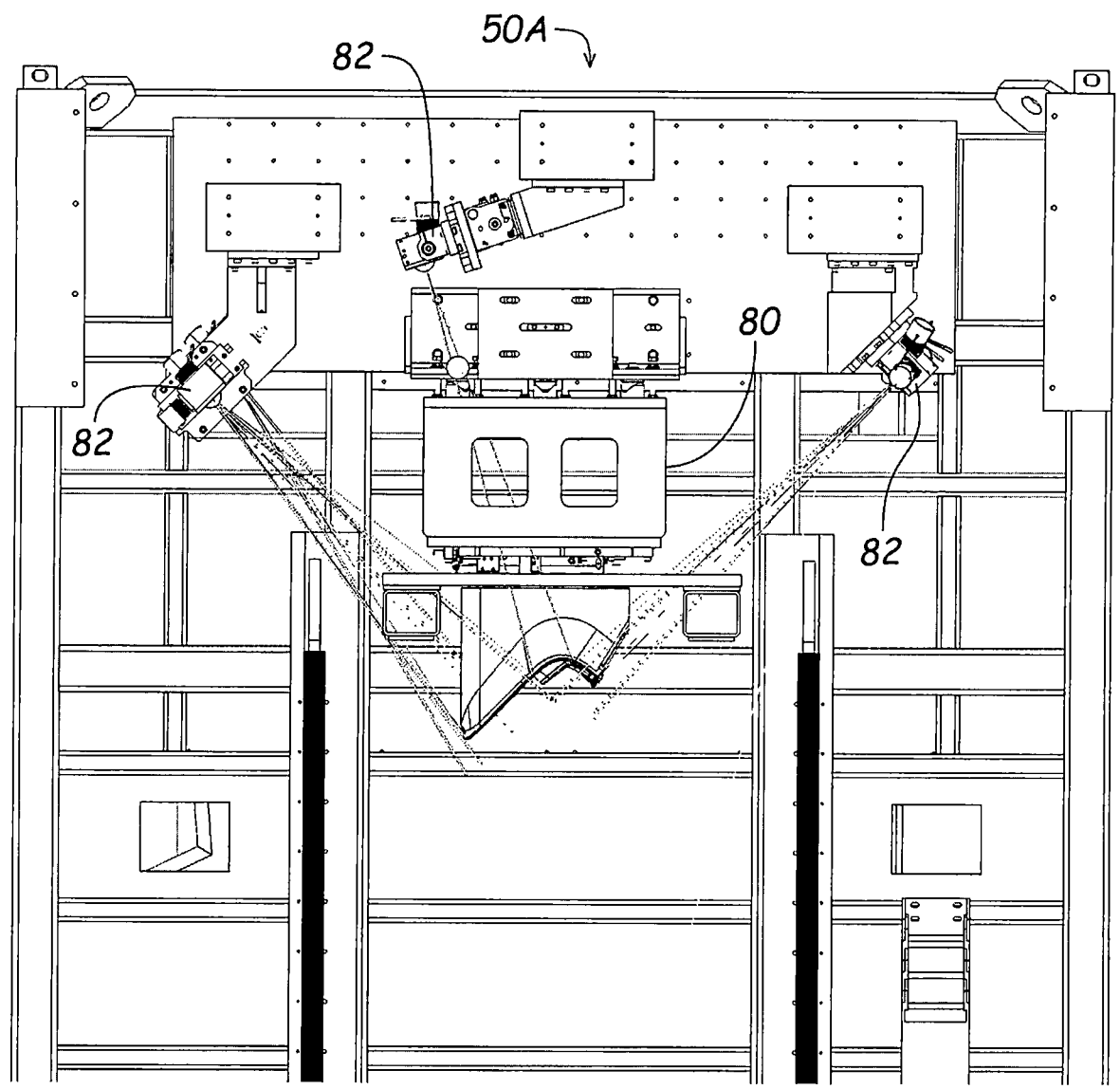
FIG. 29 is a view of FIG. 28 including some additional parts.

FIG. 21 schematically shows TTL welding of two plastic parts P1, P2 being welded together at a weld joint. One Part P1 is largely transparent to laser energy passing through it while the other part P2 is essentially opaque to laser energy. Consequently, as shown, laser energy will melt the plastic along a surface of part P2 against which a surface of part P1 is being forced by the two parts being clamped together. Unlike DELW welding, TTL welding creates a weld joint by melting plastic of part P2. To assure that a finished weld joint will be strong and leak-proof, one part is pre-melted by a heat source such as a laser, or lasers, before the parts are clamped together. Sufficient pre-melting allows the other part to have intimate contact with the melt throughout the weld joint by using clamping force to eliminate any air gaps along the joint. Once that intimate contact has been achieved, one or more lasers are operated to create additional melting after which they are turned off while the parts remain clamped together until the melt cools to solidification.

One of the parts to be joined may be fixtured in a first fixture mounted on the tilt plate 66 of the lower platen 56 after which the other part is placed on the fixtured part. Motions of the platen, the slide plate 64, and the tilt plate are then controlled to avoid collisions, as explained earlier, and finally bring the two parts to place the other part in a second fixture mounted on the immovable carriage. That other part is then clamped in the second fixture after which the platen, the slide plate, and the tilt plate operate to move away from the first fixture while continuing to avoid collisions. The part in the first fixture is then pre-melted by a heat source, i. e. a laser or lasers.

After sufficient pre-melting of the part in the first fixture, the platen, the slide plate, and the tilt plate operate to move the first part back into contact with the second part. Lasers located on and around the carriage and the machine framework then operate to perform the TTL welding process. After that has been completed, the weld joint is allowed to solidify, the part in the second fixture is unclamped, and the platen, the slide plate, and the tilt plate operate to move the assembled first and second parts away from the second fixture to a location where the assembly is unclamped from the first fixture.

FIGS. 30-33 show an example of a laser beam aiming system 170 which comprises a laser 172 and a galvo scanner 174. Examples of suitable lasers are models made by IPG Photonics Corporation, 500W Laser Part Number: YLR-500-MM-AC-Y14 and 300W Laser Part Number YLR-300-MM-AC-Y14. An example of scanner 174 is made by Cambridge Technologies, Scan Head Part Number: L2H14X2-GSBE-13-B001.

The laser itself is mounted on a base 176 which can be slid along the length of parallel tracks 178, 180 of a mounting plate 182 to position the laser at a desired location along those tracks. The mounting plate is fastened to the machine framework or a component mounted on that framework. Once the mounting plate has been mounted at a particular location, the laser base 176 is slid along the tracks to a desired location where screws 184 are then tightened to lock the base in place at that desired location.

Figure 30:
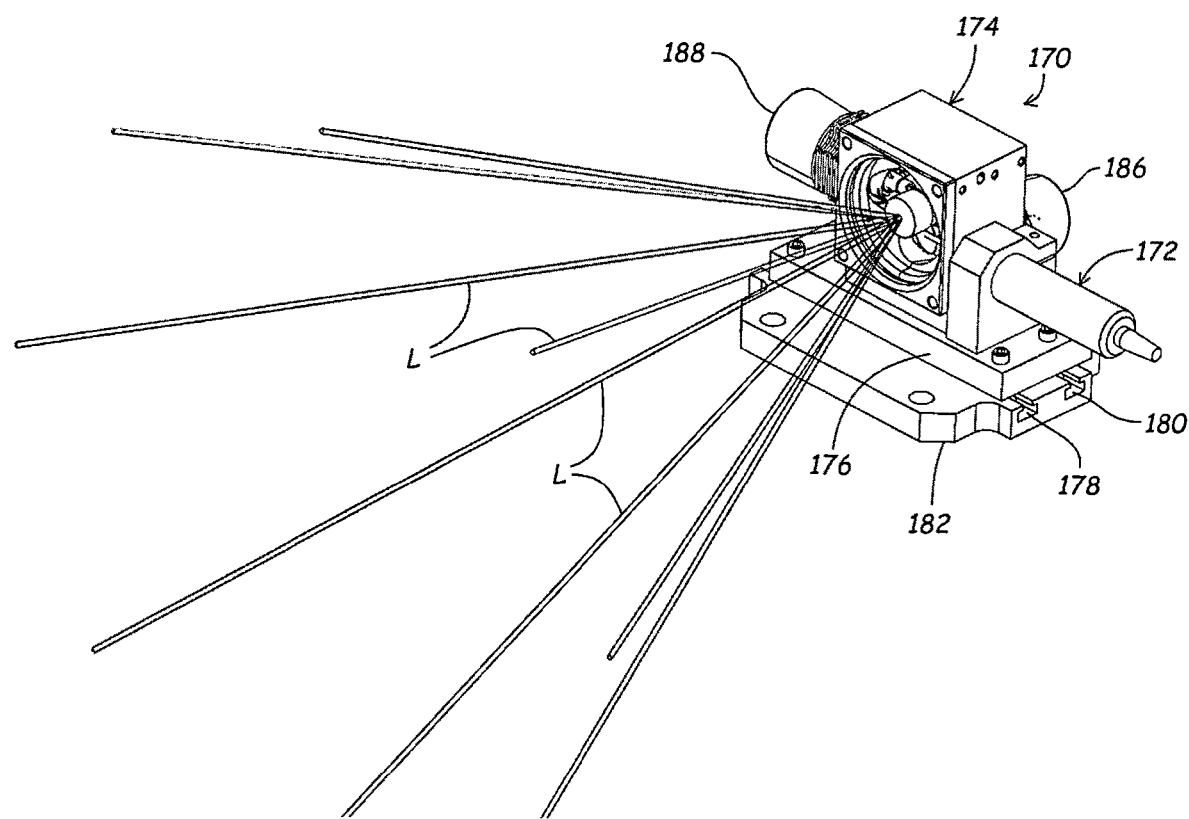
FIG. 30 is a perspective view of a laser.
Figure 31:
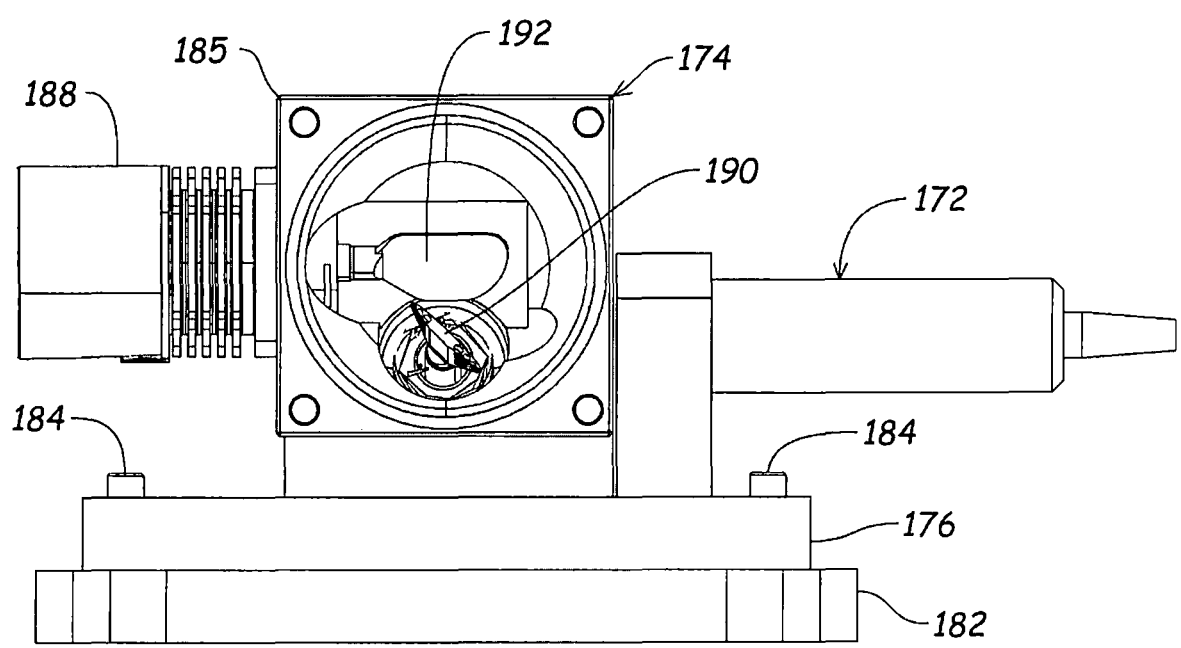
FIG. 31 is a front view of the laser.
Figure 32:
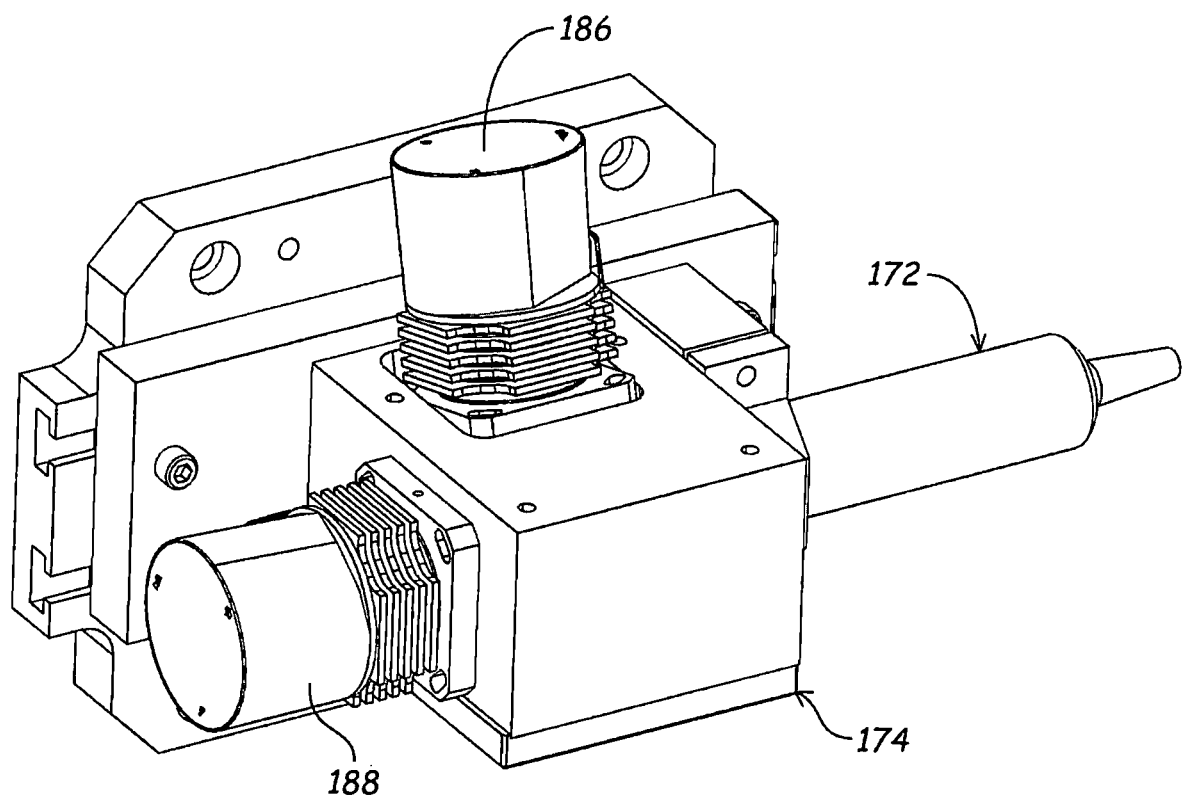
FIG. 32 is a perspective view of the laser from one direction.
Figure 33:
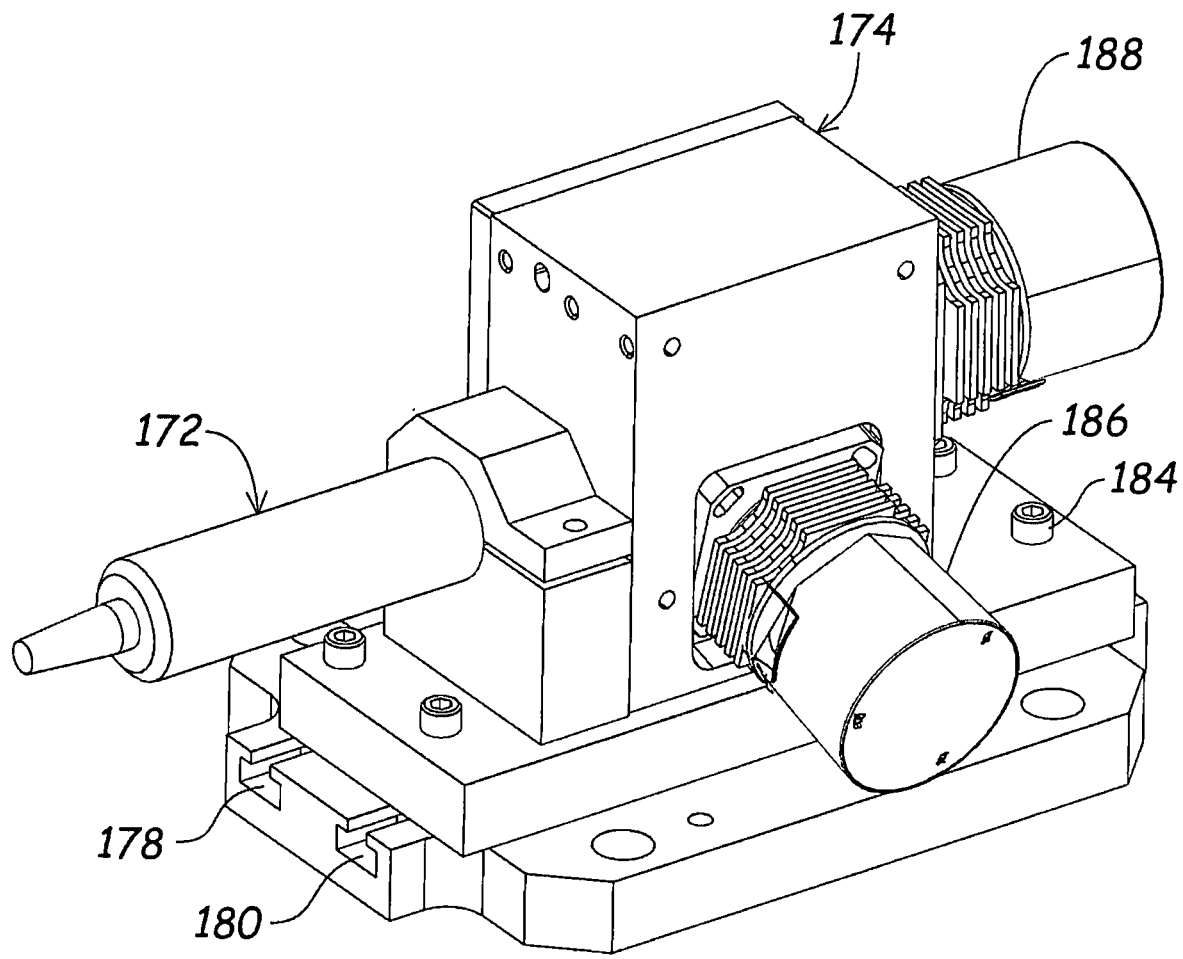
FIG. 33 is a perspective view of the laser from another direction.
Figure 34:
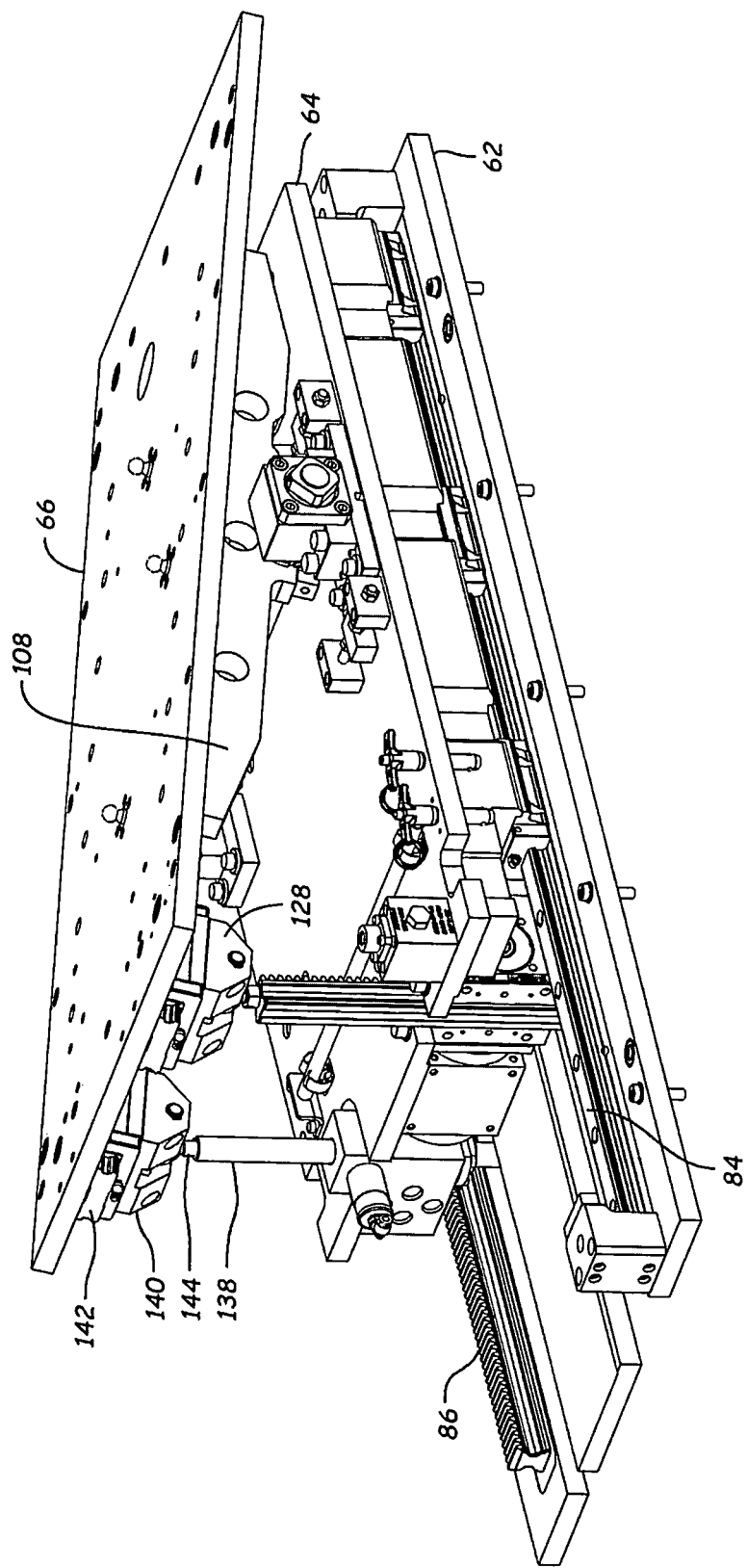
FIG. 34 is a perspective view in the direction of arrow 34 in FIG. 15.
Figure 35:
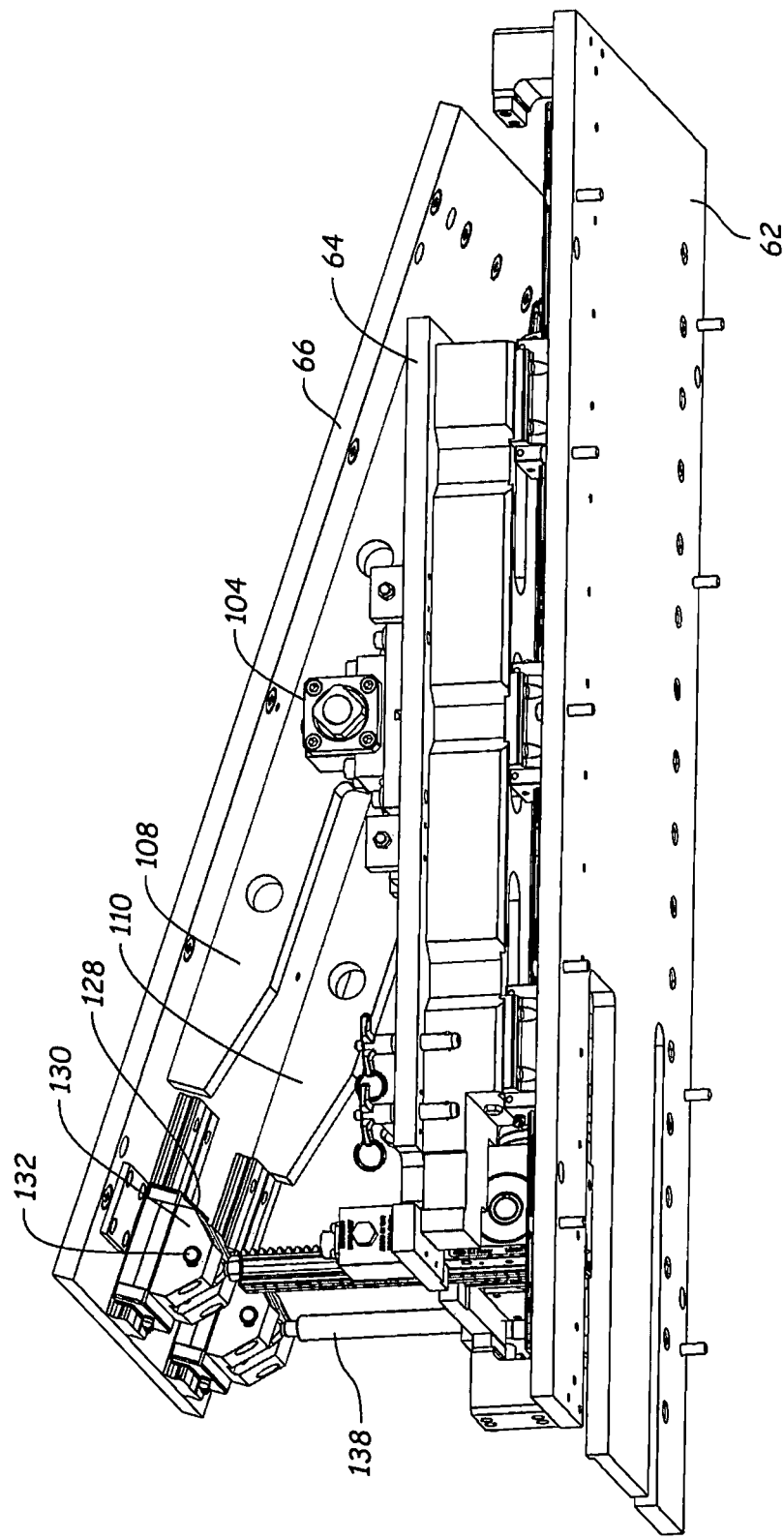
FIG. 35 is a perspective view of FIG. 34 from a different direction.
Figure 36:
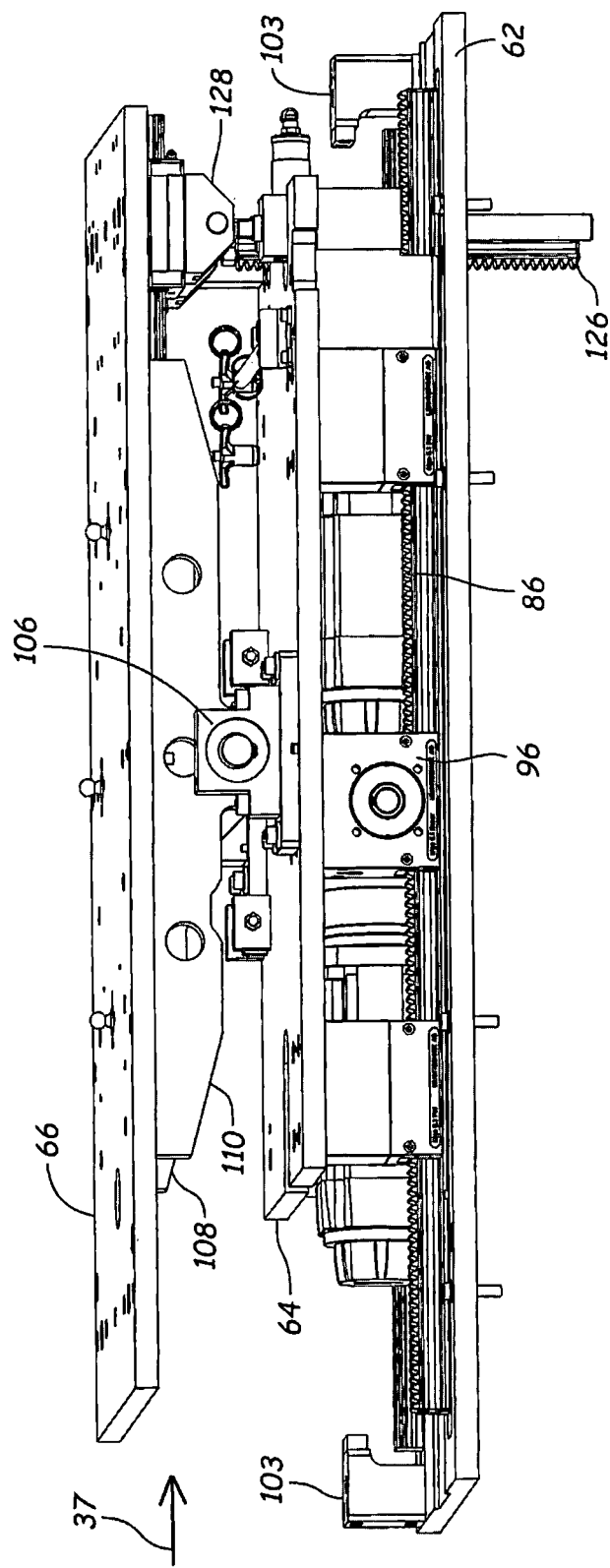
FIG. 36 is a perspective view in the general direction of arrow 36 in FIG. 12.
Figure 37:
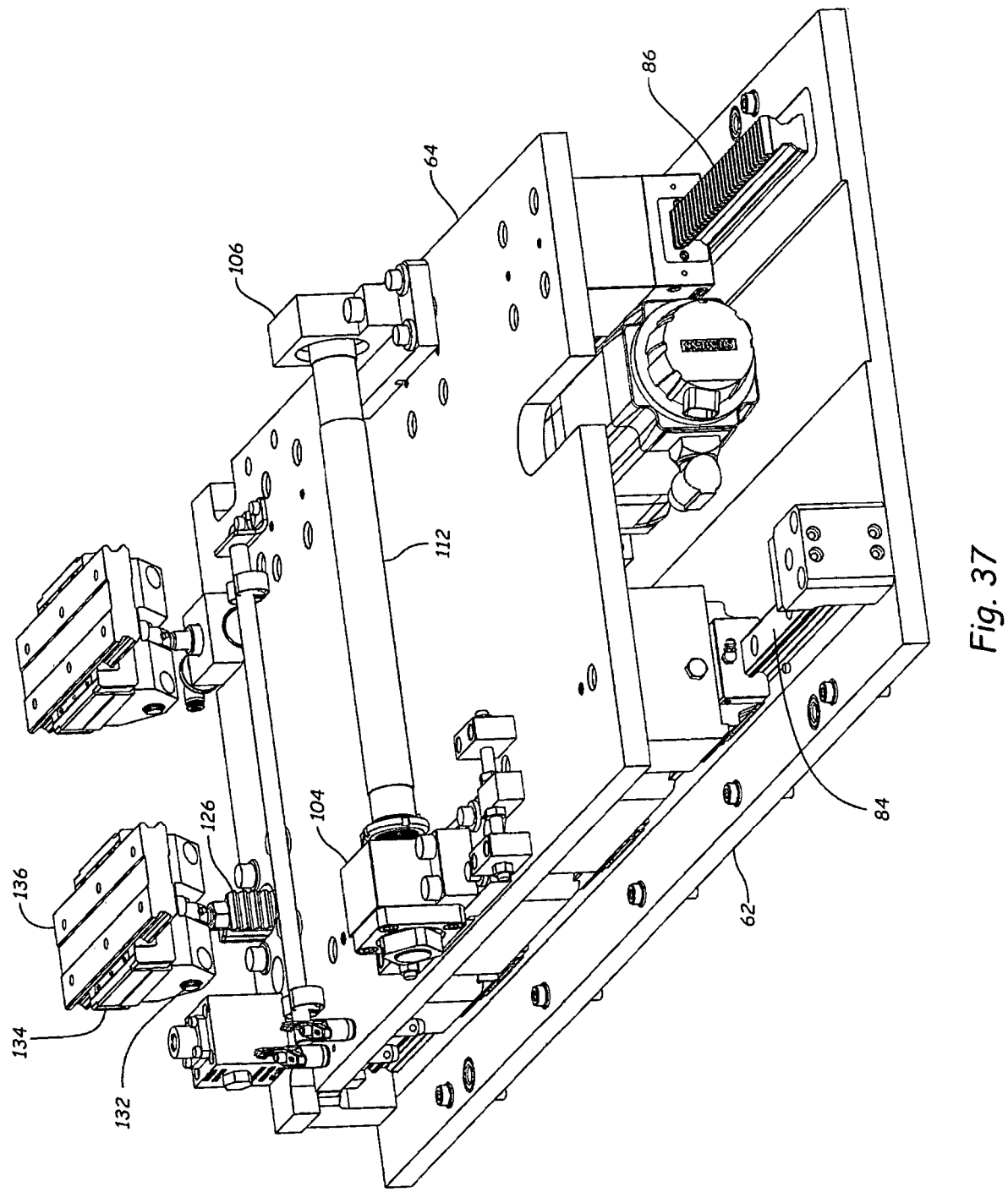
FIG. 37 is a perspective view in the general direction of arrow 37 in FIG. 36 with some parts having been removed.

The laser beam L can be aimed in many directions as suggested by FIG. 30. Aiming is performed by scanner 174 which has an enclosure on which two servomotors 186, 188 are mounted. Servomotor 186 positions a shaft on which a first mirror 190 is mounted for turning about a first axis. Second servomotor 188 positions a shaft on which a second mirror 192 is mounted for turning about a second axis. The first axis lies in a first plane which is perpendicular to the incident laser beam. The second axis lies in a second plane which is perpendicular to the first plane.

The beam from laser 172 initially strikes first mirror 190 which reflects the beam toward second mirror 192. The second mirror then reflects the laser beam through a window of the enclosure. The positions of the respective mirrors about their respective axes set the direction in which the laser beam exits the window. Controlling the positions of the mirrors controls the direction in which the laser beam exits the laser beam aiming system, as suggested by FIG. 30. In that way a control algorithm controls aiming of the laser beam to follow a portion of the weld path along which the plastic parts are being welded together.

Figure 38:
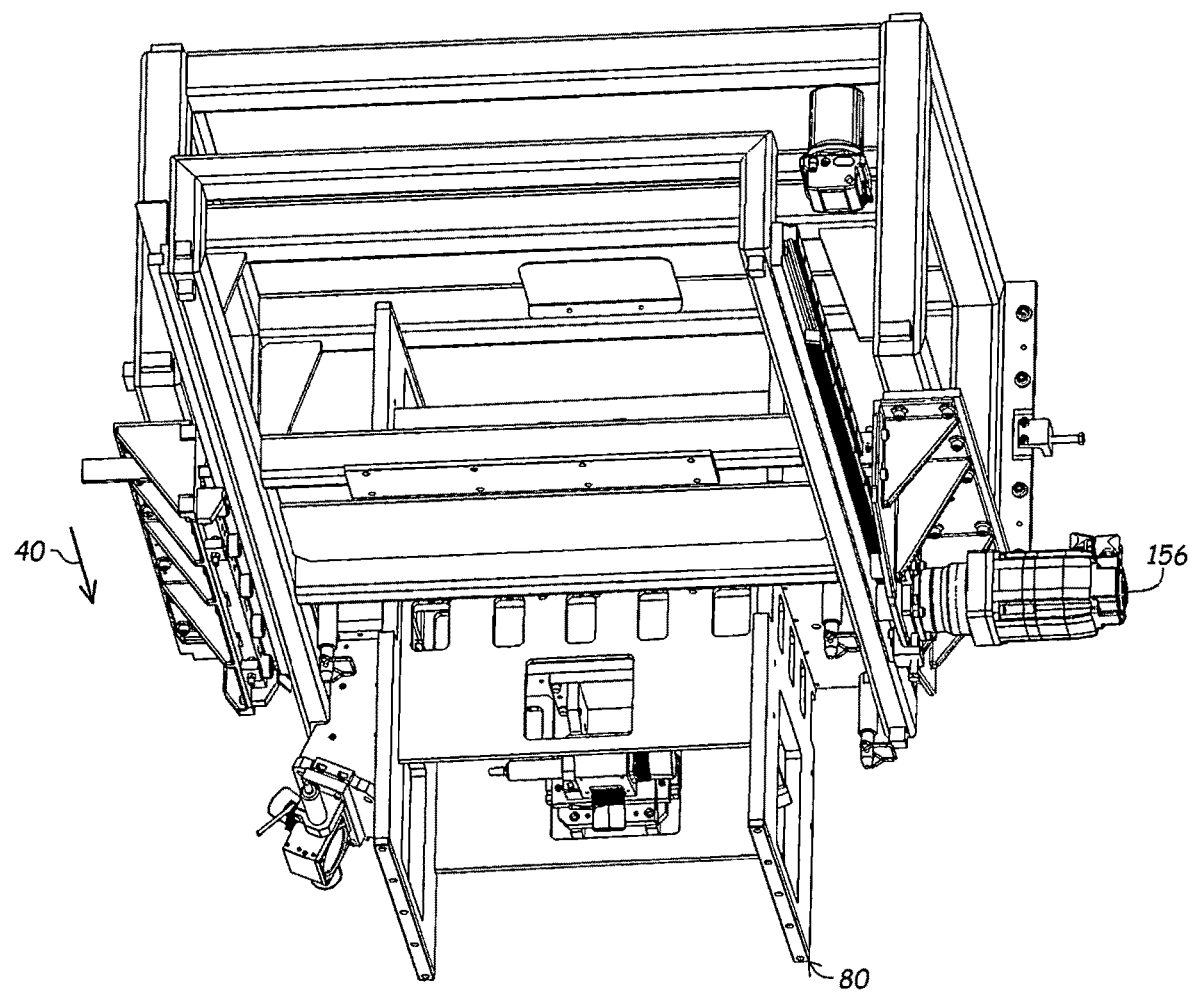
FIG. 38 is an enlarged perspective view in the direction of arrow 38 in FIG. 10.
Figure 39:
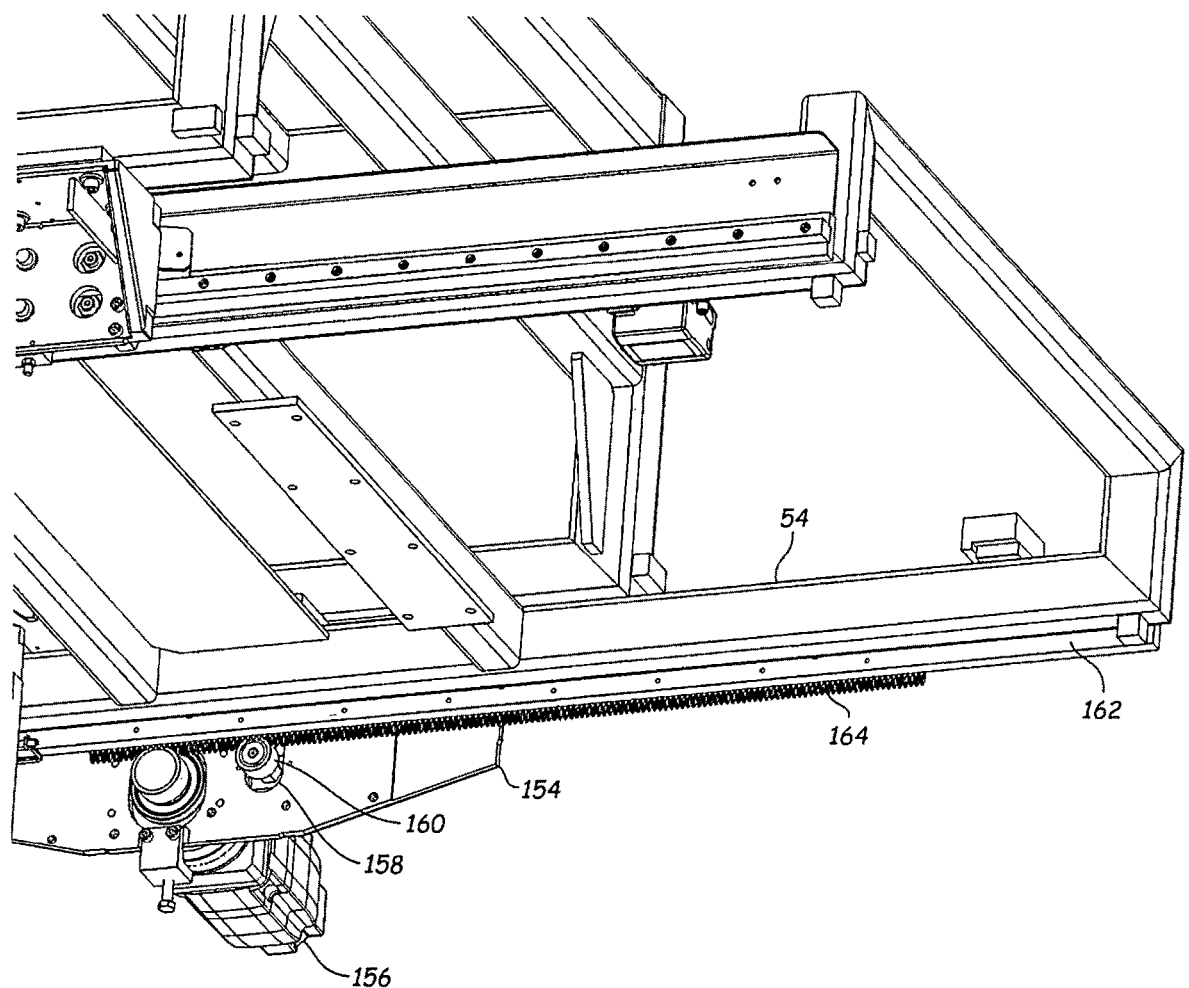
FIG. 39 is an enlarged fragmentary perspective view of a portion of FIG. 38 from a different direction.
Figure 40:
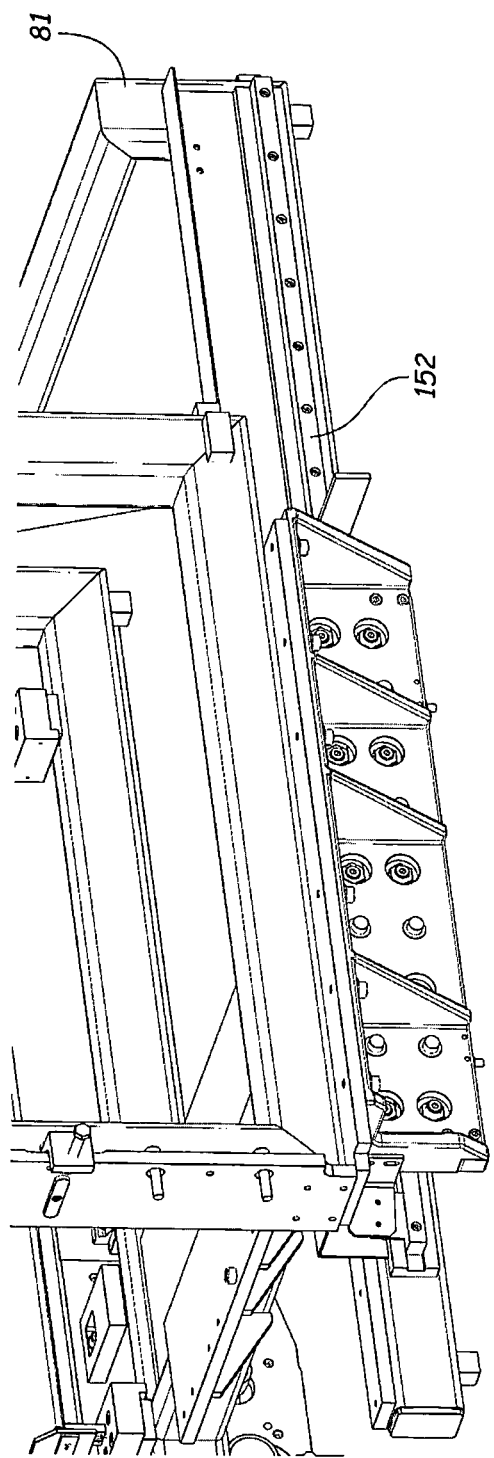
FIG. 40 is an enlarged fragmentary perspective view in the direction of arrow 40 in FIG. 38.
Figure 41:
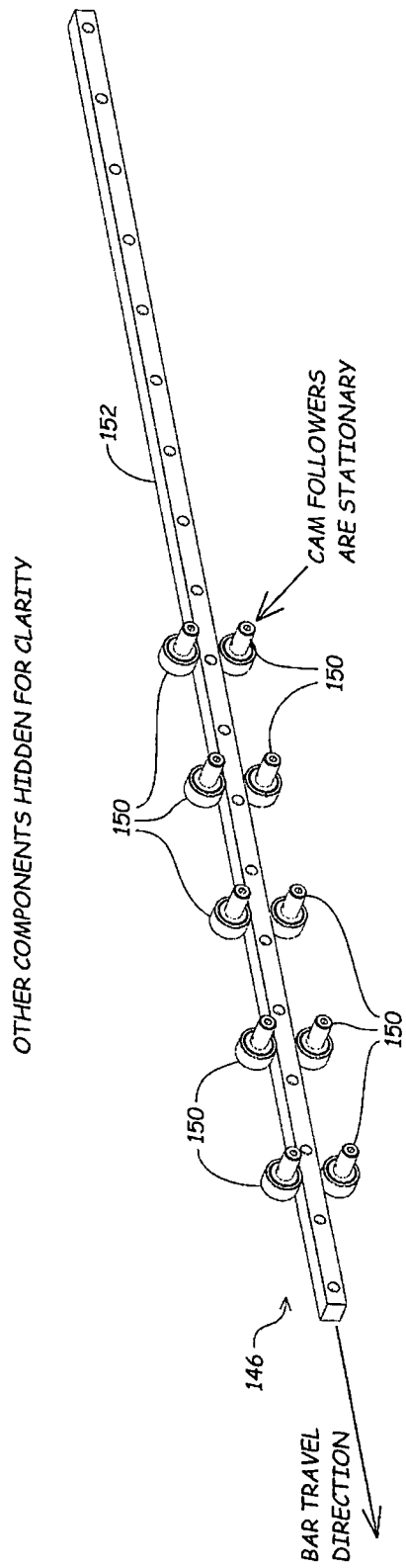
FIG. 41 is a view of FIG. 40 with portions having been removed.

More detail of carriage 80 and carriage frame 81 is shown in FIGS. 38-40. Two rows 146, 148 of five cam followers 150 each are mounted a portion of framework 54. The cam followers guide a bar 152 for bi-directional linear travel in a direction parallel with the y-axis. Bar 152 is fastened to a portion of carriage frame 81 to one side of carriage 80. To the other side of carriage 80, a bracket 154 is fastened to framework 54. An electric servomotor 156 is mounted on bracket 154 with the body of the servomotor being disposed on the outside of the bracket. The bracket has a through-hole 158 through which a shaft of the servomotor passes. On the inside of the bracket, a pinion gear 160 is fastened to the shaft. A bar 162 whose length extends in a direction parallel with the y-axis is guided on framework 54 for lengthwise translation. A toothed rack 164 is mounted lengthwise on bar 162 for travel with bar 162. Teeth of pinion gear 160 mesh with the rack teeth.

Consequently, when pinion gear 160 is rotated by servomotor 156, the pinion gear imparts translation to carriage 80 via rack 164. When the servomotor rotates the pinion in one sense, the carriage translates in one direction to advance the carriage toward the position shown in FIG. 11, and when the servomotor rotates the pinion in an opposite sense, the carriage translates in the opposite direction to retract the carriage toward the position shown in FIGS. 7-10.

Figure 43:
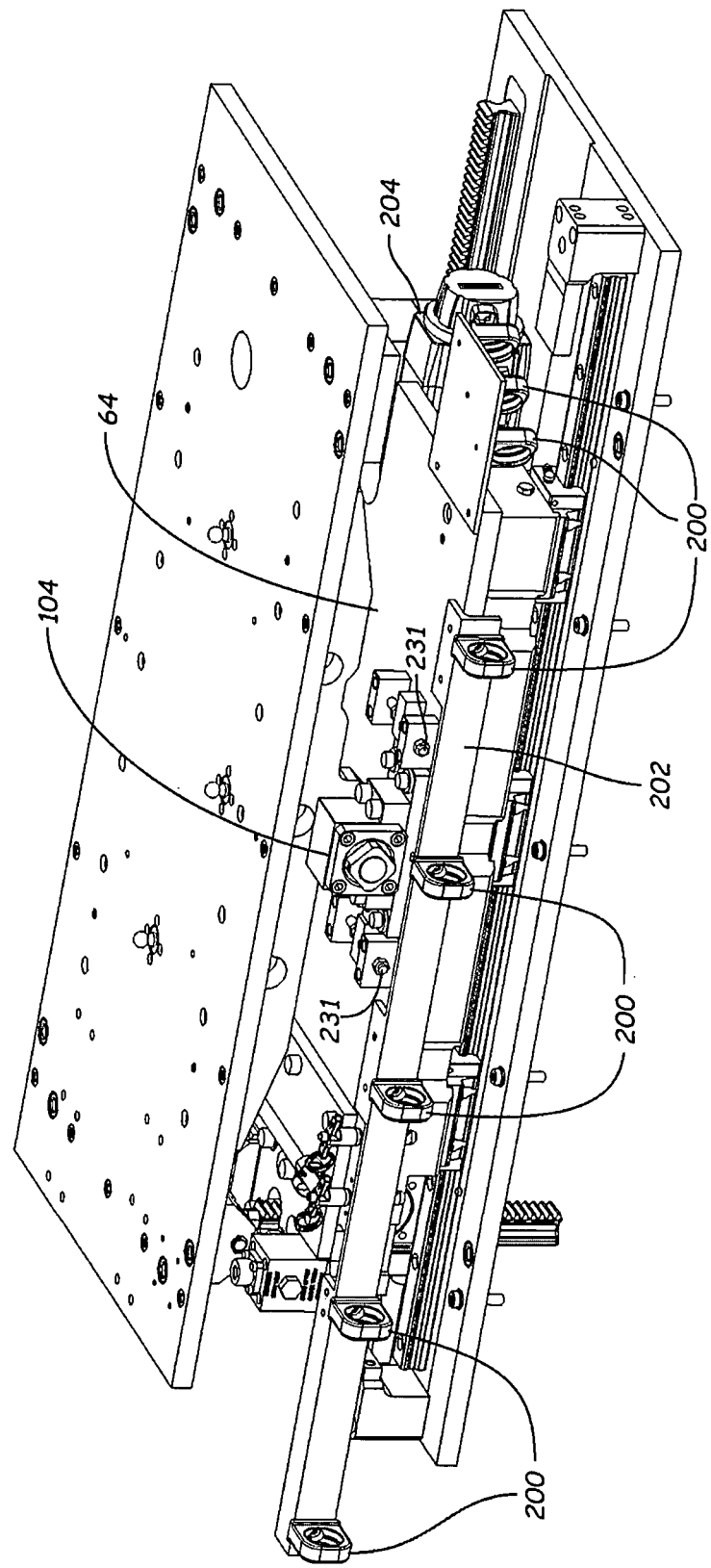
FIG. 43 is a view similar to FIG. 12 showing additional parts.

FIG. 43 is a view similar to FIG. 12 showing the addition of multiple cable guides 200 mounted on slide plate 64 by brackets 202, 204. Electric cables (not shown) pass through the cable guides which keep the cables organized as they pass along the slide plate. Cable guides 200 are spaced apart so that they retain the electric cables closer to components on the slide plate to which they are connected while the slide plate is traveling.

Figure 44:
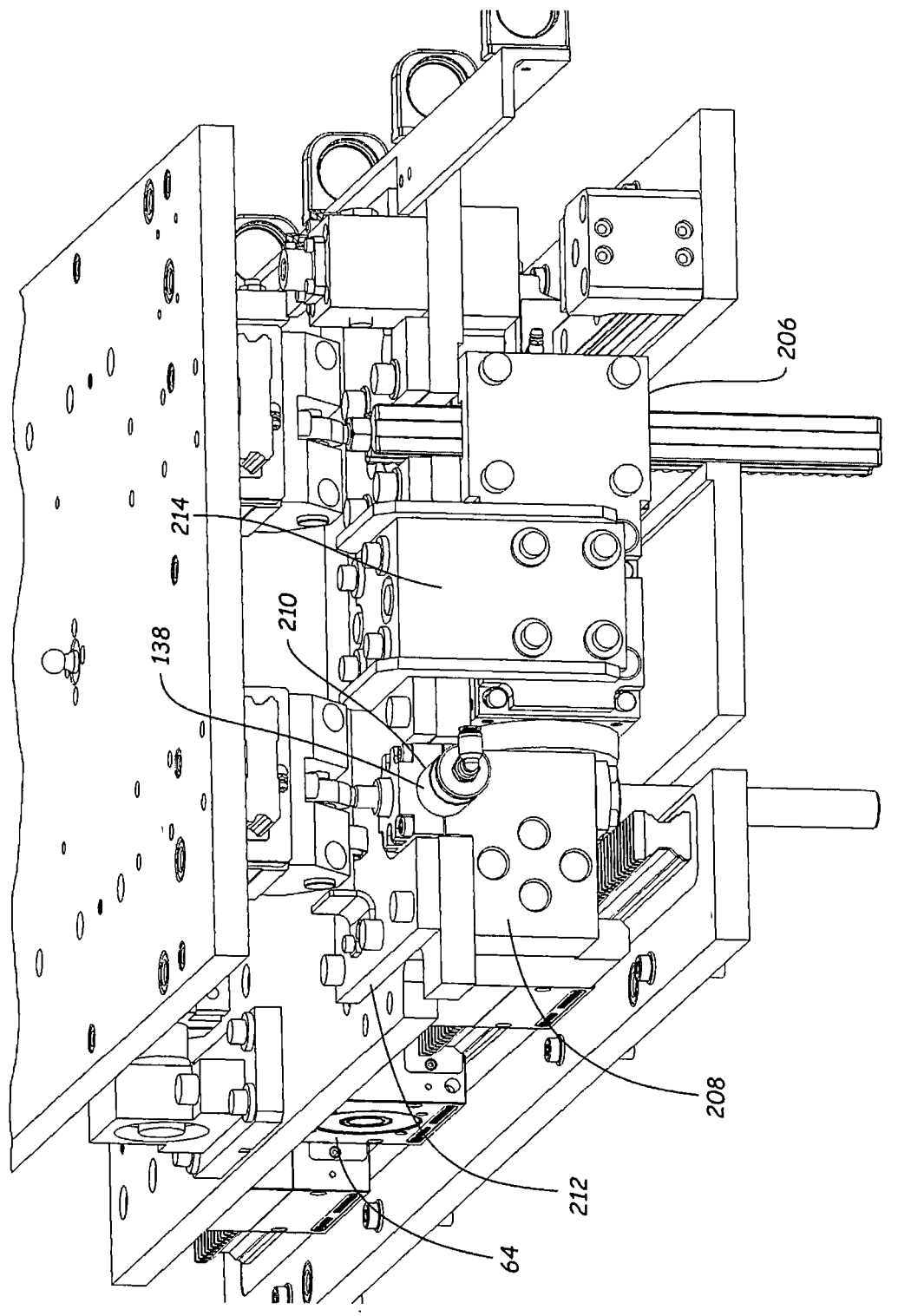
FIG. 44 is an enlarged view in the direction of arrow 44 in FIG. 43.

FIG. 44 is an enlarged view of FIG. 43 from a different direction showing additional components which have been added to the embodiment shown in FIGS. 12-19. Those additional components strengthen the assembly of certain parts to the slide plate.

A plate 206 is fastened to pinion box 118. The rod lock cylinder 138 has a main housing 208 containing a semi-circular cavity for holding the cylinder and a cap 210 which is fastened to the main housing and has a semi-circular cavity which captures the cylinder on the main housing. A plate 212 is fastened to slide plate 64, and a right angle bracket 214 is fastened to plate 212 and to plate 206.

Figure 45:
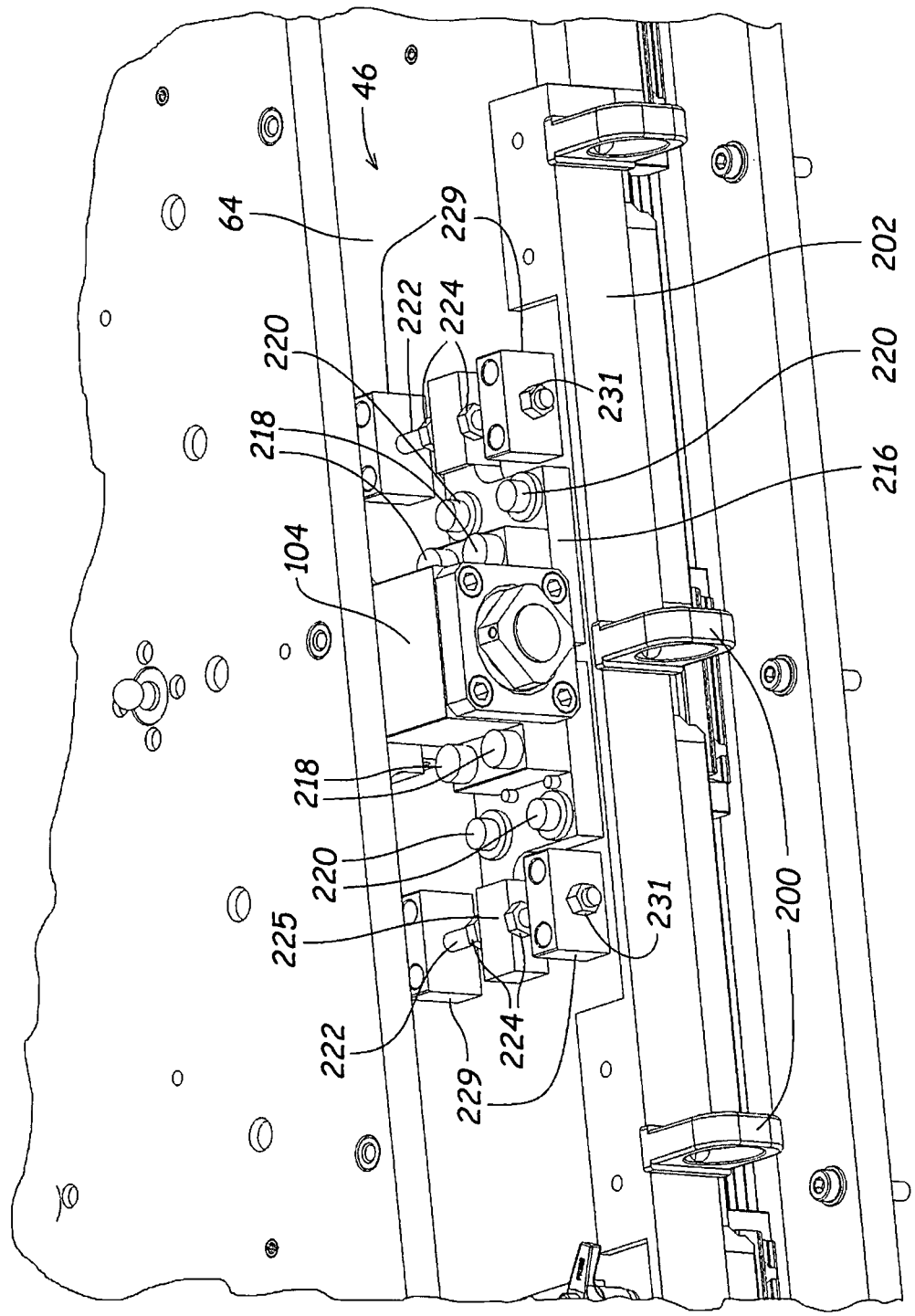
FIG. 45 is an enlarged view in the direction of arrow 45 in FIG. 43.
Figure 46:
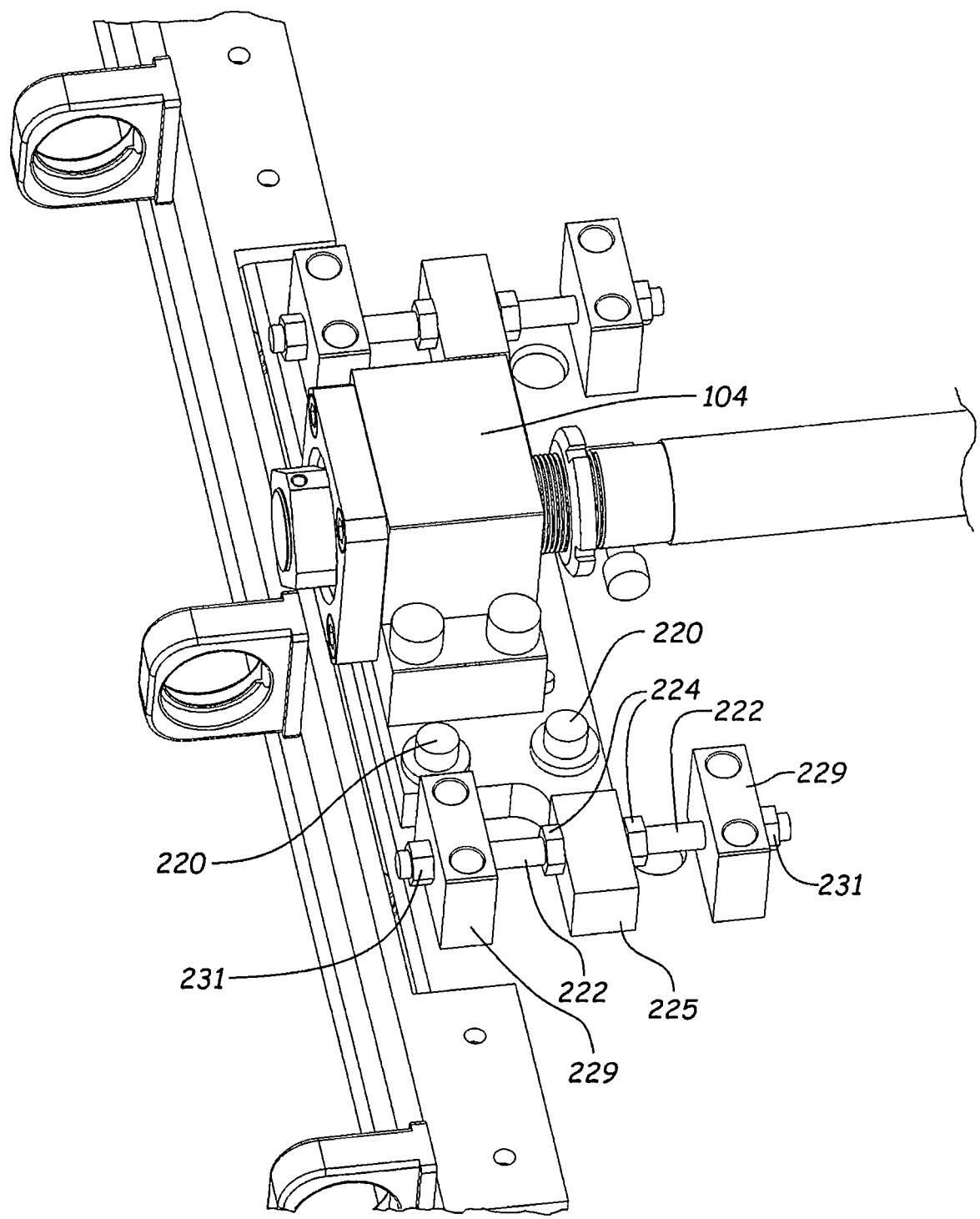
FIG. 46 is an enlarged view in the direction of arrow 46 in FIG. 45.

FIG. 45 shows tilt plate bearing 104 and its mounting on slide plate 64. Bearing 104 has a housing which is mounted on a base plate 216 by fasteners 218. Base plate 216 is fastened to slide plate 64 by fasteners 220. Fasteners 220, when loosened, allow base plate 216 to be re-positioned along the tilt axis. Re-positioning is performed by hex bolts 222 having heads 224 which are tightened to bear against sides of arms 225 of base plate 216. There are four hex bolts 222 each of which is guided for travel in a direction parallel with the tilt axis by a respective guide block 229 fastened to slide plate 64. At ends of hex bolts 222 opposite the ends which bear against opposite sides of arms 225, nuts 231 are threaded onto hex bolts 222 and bear against guide blocks 229 to prevent movement of base plate 216, and hence keep bearing 104 in place on slide plate 64.

Re-positioning of bearing 104 on slide plate 64 in a direction parallel with the tilt axis is performed by loosening nuts 231, and then turning the bolts 222 in a direction of adjustment (either forward or backward along an axis parallel with the tilt axis), to move base plate 216 to a desired position, and then tightening all nuts 231 against the guide blocks 229.

What is claimed is:

1. A plastic welding machine for welding plastic parts together, the plastic welding machine comprising:
    a first platen and a second platen (56, 58) which are relatively moveable on a framework (54) toward and away from each other in a direction parallel with a first axis (z-axis) of a 3-D coordinate system;
    a slide assembly (60) comprising a base plate (62) which is disposed against a surface of one of the first and second platens opposite the other of the first and second platens and which is fastened to the one of the first and second platens;
    the slide assembly comprising a slide plate (64) which faces the other of the upper and lower platens and which is movable on the base plate linearly relative to both platens in a direction parallel with a second axis (x-axis) of the 3-D coordinate system;
    a tilt plate (66) mounted on the slide plate for tilting about a tilt axis which is parallel with a third axis (y-axis) of the 3-D coordinate system and a prime mover (124) for turning the tilt plate about a tilt axis which is parallel with the third axis of the 3-D coordinate system;
    further comprising a mechanism operated by the prime mover (124) for turning the tilt plate about a tilt axis which is parallel with a third axis of the 3-D coordinate system, the mechanism comprising, a pinion box which is mounted on the tilt plate and has a housing which contains a toothed pinion gear supported by the housing for rotation about an axis parallel with the third axis of the 3-D coordinate system.

2. The plastic welding machine as set forth in claim 1 in which the mechanism comprises a gear box having an output shaft coupled to the pinion gear for turning the pinion gear, and the prime mover comprises a bidirectional servo motor coupled to an input shaft of the gear box.

3. The plastic welding machine as set forth in claim 2 in which the mechanism further comprises a toothed rack which extends in a direction parallel with the first axis and is guided by the housing of the pinion box for bidirectional travel in that direction.

4. The plastic welding machine as set forth in claim 3 in which the housing comprises a flat top surface higher than certain components mounted on the slide plate including the gear box and the servo motor, and filler pieces are mounted on top surfaces of those components, the filler pieces having flat top surfaces which are co-planar with the flat top surface of the housing.

5. The plastic welding machine as set forth in claim 4 in which a clevis joint (128) couples an upper end of the rack with the tilt plate, the clevis joint having a housing (130) which can turn on the rack about an axis which is parallel with the third axis of the 3-D coordinate system, the clevis housing having a slide (134) which can slide along a track (136) fastened to the tilt plate as the rack translates vertically up and down relative to the base plate and the slide plate and thereby increase and decrease the tilt of the tilt plate.

6. The plastic welding machine as set forth in claim 5 including a rod lock cylinder supported on the slide plate for selectively allowing and disallowing turning of the tilt plate, the rod lock cylinder having a rod 144 extending vertically from a cylinder body and connecting to a clevis joint which can slide along a track 142 fastened to the tilt plate.

7. The plastic welding machine as set forth in claim 1 further comprising one or more lasers on the framework for heating portions of surfaces of plastic parts which are to be welded together.

8. The plastic welding machine as set forth in claim 7 in which the one or more lasers are stationarily mounted on the framework.

9. The plastic welding machine as set forth in claim 7 in which the one or more lasers are stationarily mounted on a carriage which is movable on the framework.

* * * * *